United States Patent [19]

Uchiyama

[11] Patent Number: 5,202,718
[45] Date of Patent: Apr. 13, 1993

[54] FOCUS DETECTION APPARATUS

[75] Inventor: Shigeyuki Uchiyama, Tokyo, Japan

[73] Assignee: Nikon Corporation, Tokyo, Japan

[21] Appl. No.: 754,154

[22] Filed: Sep. 3, 1991

Related U.S. Application Data

[63] Continuation of Ser. No. 490,417, Mar. 8, 1990, abandoned.

[30] Foreign Application Priority Data

Mar. 10, 1989 [JP] Japan ................................. 1-59455

[51] Int. Cl.$^5$ ............................................. G03B 13/00
[52] U.S. Cl. ................................. 354/407; 358/227
[58] Field of Search ........................... 354/400–409; 358/227; 250/201.2, 204, 201.7, 201.8

[56] References Cited

U.S. PATENT DOCUMENTS

| | | | |
|---|---|---|---|
| 4,561,749 | 12/1985 | Ugagawa | 354/406 |
| 4,851,657 | 7/1989 | Taniguchi et al. | 354/408 |
| 4,859,842 | 8/1989 | Suda et al. | 354/408 |

FOREIGN PATENT DOCUMENTS

| | | |
|---|---|---|
| 60-262004 | 6/1985 | Japan. |
| 61-55618 | 12/1986 | Japan. |
| 62-155608 | 8/1987 | Japan. |
| 63-30811 | 3/1988 | Japan. |

Primary Examiner—Michael L. Gellner
Assistant Examiner—David M. Gray
Attorney, Agent, or Firm—Shapiro and Shapiro

[57] ABSTRACT

A focus detection apparatus includes two photoelectric conversion units for outputting electrical signals corresponding to light receiving amounts, an optical unit for splitting an object image into two images to cause the two images to be respectively focused on the two photoelectric conversion unit, and a judging unit for judging on the basis of the electrical signals from the photoelectric conversion unit whether or not the object image has a periodic contrast pattern.

16 Claims, 16 Drawing Sheets

CONTRAST

CONTRAST

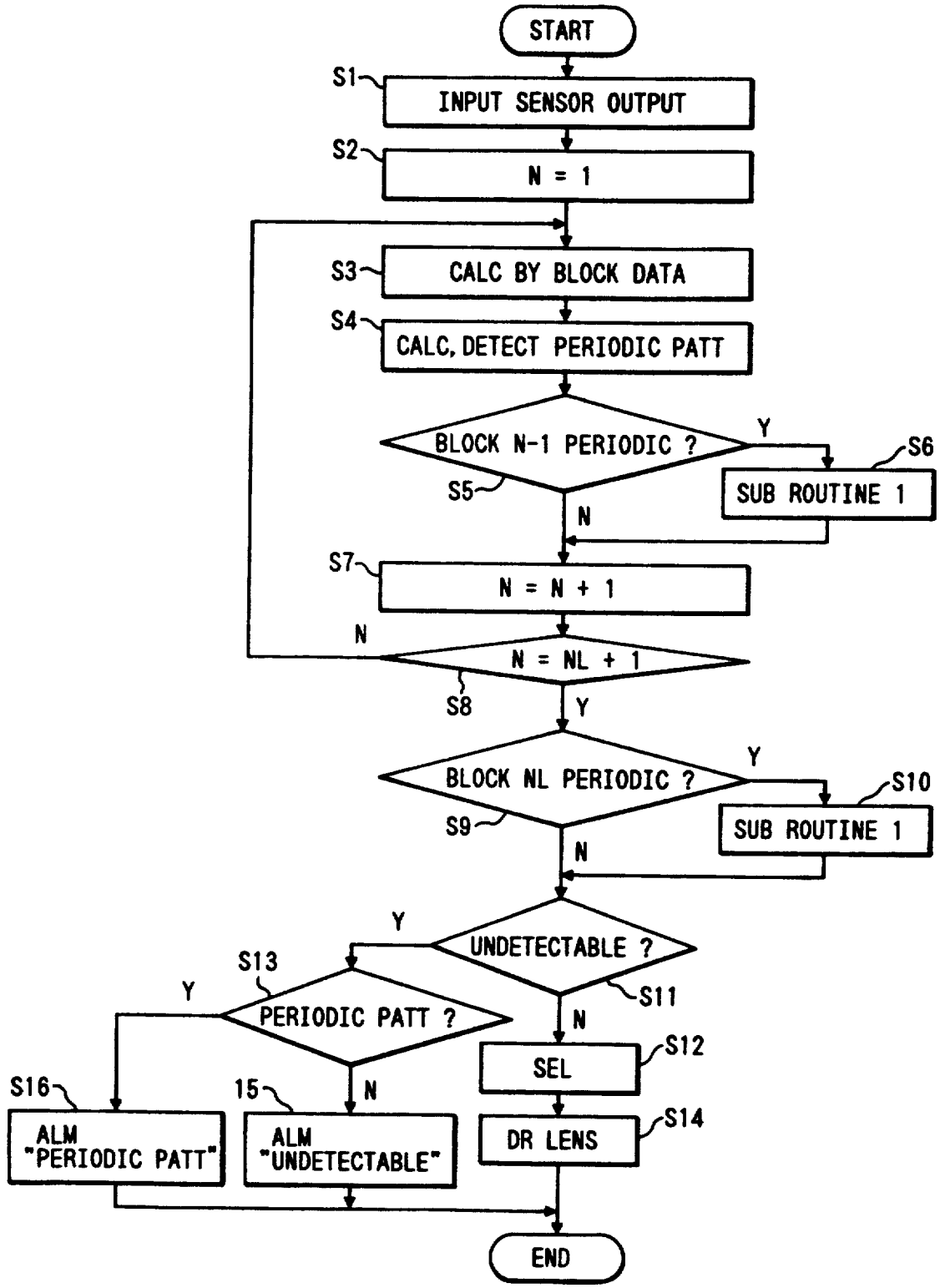

FOCUS DETECTION APPARATUS

This is a continuation of application Ser. No. 490,417 filed Mar. 8, 1990, now abandoned.

BACKGROUND OF THE INVENTION

1. Field of the Invention

The present invention relates to a focus detection apparatus used in, e.g., a single-lens reflex camera.

2. Related Background Art

As a conventional focus detection system, a phase difference detection system is known.

The phase difference detection system will be described below with reference to FIG. 15. Light incident through a region 101 of an object-lens 100 is focused on an image sensor array A through a field mask 200, a field lens 300, an aperture opening 401, and a refocusing lens 501.

Similarly, light incident through a region 102 of the object-lens 100 is focused on an image sensor array B through the field mask 200, the field lens 300, an aperture opening 402, and a refocusing lens 502.

In a so-called near-focus state wherein the object-lens 100 forms a sharp image of an object in front of a predicted focal plane, a pair of object images focused on the image sensor arrays A and B are separated away from each other. Contrary to this, in a so-called far-focus state wherein a sharp image of the object is formed behind the predicted focal plane, the two object images approach each other. In a so-called in-focus state wherein a sharp image of the object is formed on the predicted focal plane, the object images on the image sensor arrays A and B relatively coincide with each other.

Therefore, the pair of object images are photoelectrically converted into electrical signals by the image sensor arrays. These signals are subjected to arithmetic processing to obtain relative positions of the pair of object images, thus calculating a focusing state of the object-lens 100, more particularly, a defocus amount representing a separation amount from the in-focus state and its direction.

An arithmetic processing method of calculating the defocus amount will be described below.

The image sensor arrays A and B shown in FIG. 15 respectively comprise pluralities of photoelectric transducers. As shown in FIGS. 16A and 16B, the arrays A and B output pluralities of photoelectric conversion outputs a1, ..., an, b1, ..., bn, and perform correlative calculations while relatively shifting the data strings by the predetermined number L of data. More specifically, each array calculates a correlation amount C(L) by the following equation:

$$C(L) = \sum_{i=k}^{r} |ai - bj| \quad (1)$$

$$j - i = L$$
$$L = -lmax, \ldots, -2, -1, 0, 1, 2, \ldots, lmax$$

where L is an integer corresponding to a shift amount of the data string, as described above, and the first term k and the final term r may be changed depending on the shift amount L.

Of the calculated correlation amounts C(L), a shift amount which yields a local minimum correlation amount is multiplied with a constant determined by the optical system and a pitch of the photoelectric transducers of the image sensor arrays A and B shown in FIG. 15, thus obtaining a defocus amount.

However, the correlation amount C(L) is a discrete value, as shown in FIG. 16C, and a minimum unit of a detectable defocus amount is restricted by the pitch of the photoelectric transducers of the image sensor arrays A and B. Thus, a method of calculating a new local minimum value $C_{ex}$ by performing interpolation calculations based on the discrete correlation amounts C(L) to execute precise focus detection is disclosed in U.S. Pat. No. 4,561,749.

The interpolation calculations are made using a correlation amount $C_0$ as a local minimum value and correlation amounts $C_1$ and $C_{-1}$ separated by the same shift amount on two sides of the amount $C_0$. A shift amount Fm which yields the local minimum value $C_{ex}$ and a defocus amount DF are given by the following equations:

$$DF = Kf \times Fm \quad (2)$$
$$Fm = L + DL/E$$
$$DL = (C_{-1} - C_1)/2$$
$$C_{ex} = C_0 - |DL|$$
$$E = \text{MAX}\{C_1 - C_0, C_{-1} - C_0\}$$

where MAX ($C_a$, $C_b$) means to select a larger one of $C_a$ and $C_b$, and Kf is the constant determined by the optical system and the pitch of the photoelectric transducers of the image sensor arrays A and B shown in FIG. 15.

It must be judged whether the defocus amount obtained in this manner indicates a true defocus amount or is caused by a variation in correlation amount due to noise components. When the following condition is satisfied, it can be judged that the defocus amount is reliable:

$$E > E1 \text{ and } C_{ex}/E < G1 \text{ (}E1 \text{ and } G1 \text{ are predetermined values) Condition} \quad (1)$$

where E is a value depending on the contrast of an object, and as the value E is larger, the contrast is higher, and reliability is also higher. $C_{ex}/E$ mainly depends on noise components, and as it is closer to 0, reliability becomes higher. When it is determined that the obtained defocus amount is reliable, the object-lens 100 is moved to an in-focus position based on the defocus amount DF.

In the focus detection system described above, reliable focus detection is disturbed unless object images formed on the image sensor arrays have a certain contrast or more. In general, objects to be photographed tend to have a higher horizontal contrast than a vertical contrast. Thus, the pair of image sensor arrays A and B are arranged on the photographing surface in a horizontal direction, so that focus detection is performed based on the horizontal contrast.

In another system, in consideration of a case wherein a horizontal contrast is low and a vertical contrast is high or a case wherein a camera is used in a vertical position, a pair of image sensor arrays A and B and a pair of image sensor arrays C and D are respectively arranged in both horizontal and vertical directions, as shown in FIG. 17A, so that focus detection can be performed based on both the horizontal and vertical contrasts.

In an optical system in this case, a field mask 20, a field lens 30, an aperture 40, a refocusing lens 50, and an image sensor chip 60 are arranged along the optical axis of an object-lens 10 in the order named. The field mask 20 has a cross-shaped opening, and is arranged near the predicted focal plane of the object-lens 10 so as to restrict an air image of an object focused by the object-lens 10. The aperture 40 has four openings 41, 42, 43, and 44, and these openings 41 to 44 are projected onto the object-lens 10 as opening images 11, 12, 13, and 14.

The refocusing lens 50 consists of four lenses 51, 52, 53, and 54 corresponding to the openings 41, 42, 43, and 44 of the aperture 40, respectively, as shown in FIG. 17B, and focuses an image of the field mask 20 on the image sensor chip 60.

Therefore, a light beam incident from the region 11 of the object-lens 10 is focused on the image sensor array A through the field mask 20, the field lens 30, the opening 41 of the aperture 40, and the lens 51 of the refocusing lens 50. Similarly, light beams incident from the regions 12, 13, and 14 of the object-lens 10 are respectively focused on the image sensor arrays B, C, and D.

Object images formed on the image sensor arrays A and B are separated from each other when the object-lens 10 is in a near-focus state. The images approach each other in a far-focus state. In an in-focus state, the images are aligned at a predetermined distance. Thus, the signals from the image sensor arrays A and B are subjected to arithmetic processing to detect a horizontal focusing state of the object-lens 10.

Similarly, object images formed on the image sensor arrays C and D are separated from each other when the object-lens 10 is in a near-focus state. The images approach each other in a far-focus state. In an in-focus state, the images are aligned at a predetermined distance. Thus, the signals from the image sensor arrays C and D are subjected to arithmetic processing to detect a vertical focusing state of the object-lens 10.

Whether the lens is driven based on a focusing state according to a horizontal or vertical contrast can be determined by, for example:

(1) a method of selecting a contrast having higher reliability (e.g., having the larger value E);

(2) a method of preferentially using one direction (e.g., horizontal direction) and performing focus detection using the other direction when no reliable result can be obtained or when no local minimum value $C_0$ is present and calculations are disabled; and (3) a method of averaging calculation results in both the directions.

In the focus detection apparatus described above, when a plurality of object images having different distances are formed on the image sensor arrays, an in-focus state may be erroneously determined by a near-or far-focus distance of an object from an in-focus position, or focus detection may be disabled.

Thus, in still another method disclosed in, e.g., Japanese Patent Laid-Open Nos. 60-262004 and 61-55618, U.S. Pat. No. 4,851,657, Japanese Patent Laid-Open No. 62-155608, and the like, each of a pair of image sensor arrays is divided into a plurality of blocks to segment an object, and focus detection calculations are performed in units of blocks. On the basis of a plurality of calculation results, a block in which the closest object is present or in which an object having the maximum contrast is present is selected. The calculation result of the selected block is determined as a focus detection state of an object-lens. In a camera, the object-lens is driven to an in-focus position based on the calculation result.

However, the conventional phase difference detection system is ineffective for an object having a periodic contrast. When an image of an object having a periodic contrast is formed on image sensor arrays and image sensor array outputs shown in FIG. 18A and 18B are obtained, correlation amounts C(L) have a plurality of local minimum values $C_x$, $C_y$, and $C_z$, as shown in FIG. 18C. As a result, a plurality of defocus amounts are calculated. In this case, a true defocus amount cannot be specified, and the object-lens may be driven based on a quite wrong defocus amount.

When each of a pair of image sensor arrays is divided into a plurality of blocks to segment an object, an object which does not have a periodic pattern before division may cause blocks to form periodic patterns after division.

SUMMARY OF THE INVENTION

The present invention has been made in consideration of the conventional problems, and has as its object to provide a focus detection apparatus which can eliminate a weak point of a conventional phase difference detection system against an object having a periodic contrast.

The present invention is applied to a focus detection apparatus which employs a phase difference system wherein an object image in a focus detection range is divided into two images by a focus detecting optical system, the two images are projected onto a pair of photoelectric transducer arrays, a distance measurement range is set to be one block or is divided into a plurality of blocks, and focus detection data is calculated for each block on the basis of output signals from the photoelectric transducer arrays.

The focus detection apparatus comprises: periodic pattern detection means for determining that two or more focus detection data of an object image are obtained from one block, thereby detecting that a periodic pattern has a periodic contrast; and alarming means for generating a periodic pattern alarm based on the detection output of the periodic pattern detection means.

The periodic pattern detection means determines that an object image has a periodic contrast when two or more calculation results satisfying a predetermined first condition (the above-mentioned Condition (1)) are obtained in calculations of focus detection data.

According to another aspect of the periodic pattern detection means, the detection means may determine that an object has a periodic contrast when two or more calculation results which satisfy a second condition broader than the first condition are obtained.

According to still another aspect of the periodic pattern detection means, when there is no calculation result satisfying a third condition which is more strict than the first condition, the detection means determines that an object has a periodic contrast when two or more calculation results satisfying the second condition broader than the first condition are obtained. On the other hand, when a calculation result satisfying the third condition is present, the detection means determines that an object has a periodic pattern when two or more calculation results satisfying a fourth condition more strict than the second condition are obtained. The present invention is also applied to a focus detection apparatus in which each of object images in orthogonal focus detection ranges is divided into two images by a focus detecting optical system, the two images are projected onto a corresponding one of two pairs of photoelectric transducer arrays which are orthogonally arranged, and focus detection data are calculated from output signals from the two pairs of photoelectric transducer arrays in units of photoelectric transducer arrays.

When focus detection data are independently calculated in both the horizontal and vertical directions, the apparatus comprises: periodic pattern detection means for determining that two or more focus detection data of an object image are obtained from each photoelectric transducer array so as to detect a periodic pattern having a periodic contrast; and means for, when the periodic pattern detection means detects the periodic pattern from calculation results of one photoelectric transducer array, if there is one calculation result of the one pair of photoelectric transducer arrays in a predetermined range having a calculation result of the other pair of photoelectric transducer arrays as the center, outputting the one calculation result as a true calculation result.

According to the present invention, the apparatus further comprises means for widening a range of a block from which a detection output of the periodic pattern detection means is obtained and recalculating focus detection data.

According to the focus detection apparatus of the present invention with the above arrangement, since the periodic pattern detection means is arranged, it can be determined whether or not an object image has a periodic pattern. Thus, a periodic pattern alarm is generated to a photographer independently of a focus undetectable alarm caused by a low contrast, thus signaling to him or her that an error is caused by an object having a periodic contrast.

Therefore, the photographer can instantaneously know that focus detection is disabled since an object has no contrast or since an object has a periodic pattern, and can take an appropriate countermeasure.

When focus detecting element arrays are orthogonally arranged in the horizontal and vertical directions and when a periodic pattern is detected in, e.g., the horizontal direction, if there is one horizontal calculation result in a predetermined range having a vertical calculation result as the center, the calculation result is efficiently utilized as horizontal focus detection data.

In particular, as most of objects forming a periodic pattern, objects (e.g., trees) which extend vertically are periodically aligned in the horizontal direction like a row of trees. Such objects tend not to simultaneously form periodic patterns in both the horizontal and vertical directions. Therefore, even when a horizontal periodic pattern is detected, a correct calculation result can be obtained in the vertical direction. Thus, proper focus detection data can be found out from the horizontal periodic pattern by utilizing the vertical calculation result.

Furthermore, when an image sensor array is divided into a plurality of blocks to perform focus detection and when a periodic pattern is detected from a specific block, the specific block is widened to recalculate data. Thus, the present invention is effective when an object which does not form a periodic pattern in a wide range forms a periodic pattern after it is divided into blocks.

BRIEF DESCRIPTION OF THE DRAWINGS

FIG. 10 is a flow chart showing the second embodiment of the present invention;

DESCRIPTION OF THE PREFERRED EMBODIMENTS

Figure 1:
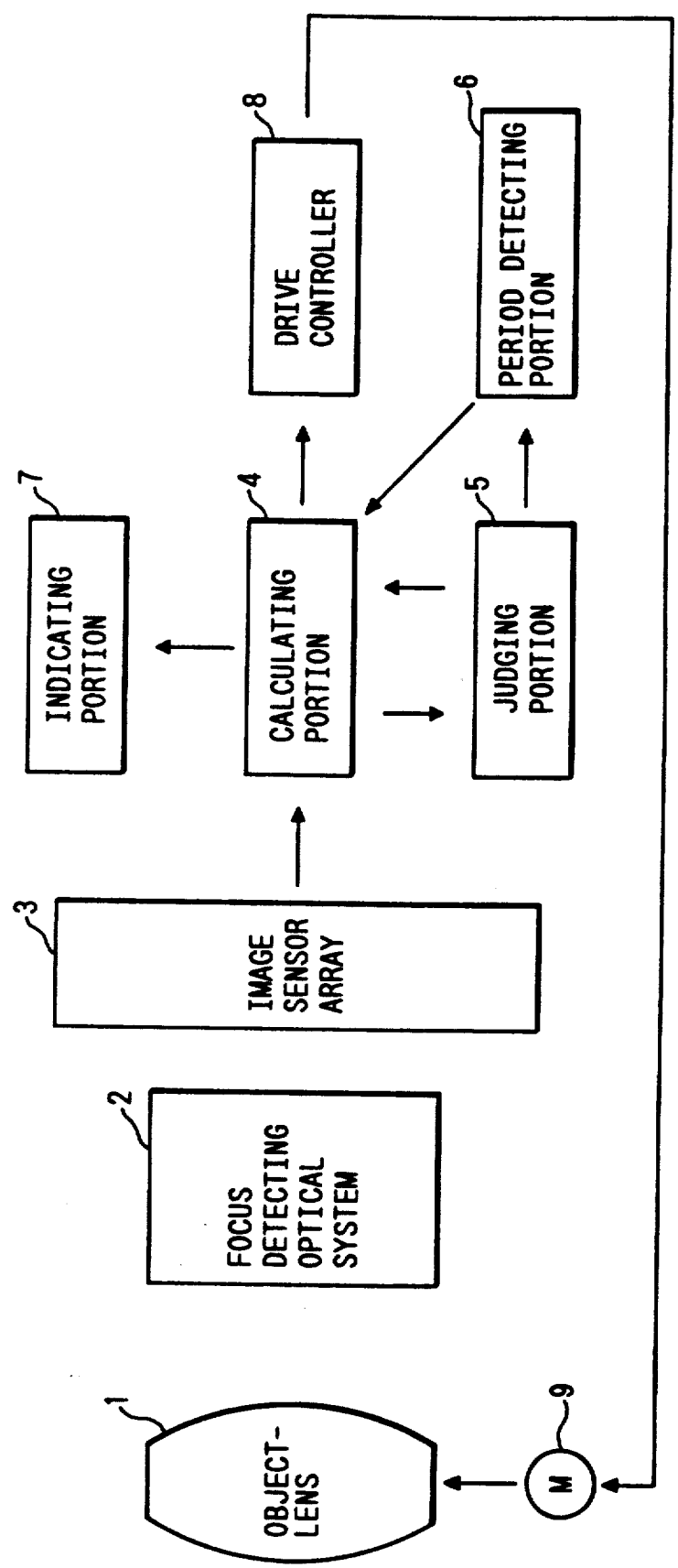
FIG. 1 is a schematic block diagram of an arrangement of the present invention.

FIG. 1 is a schematic block diagram of the arrangement of the present invention.

Figure 13:
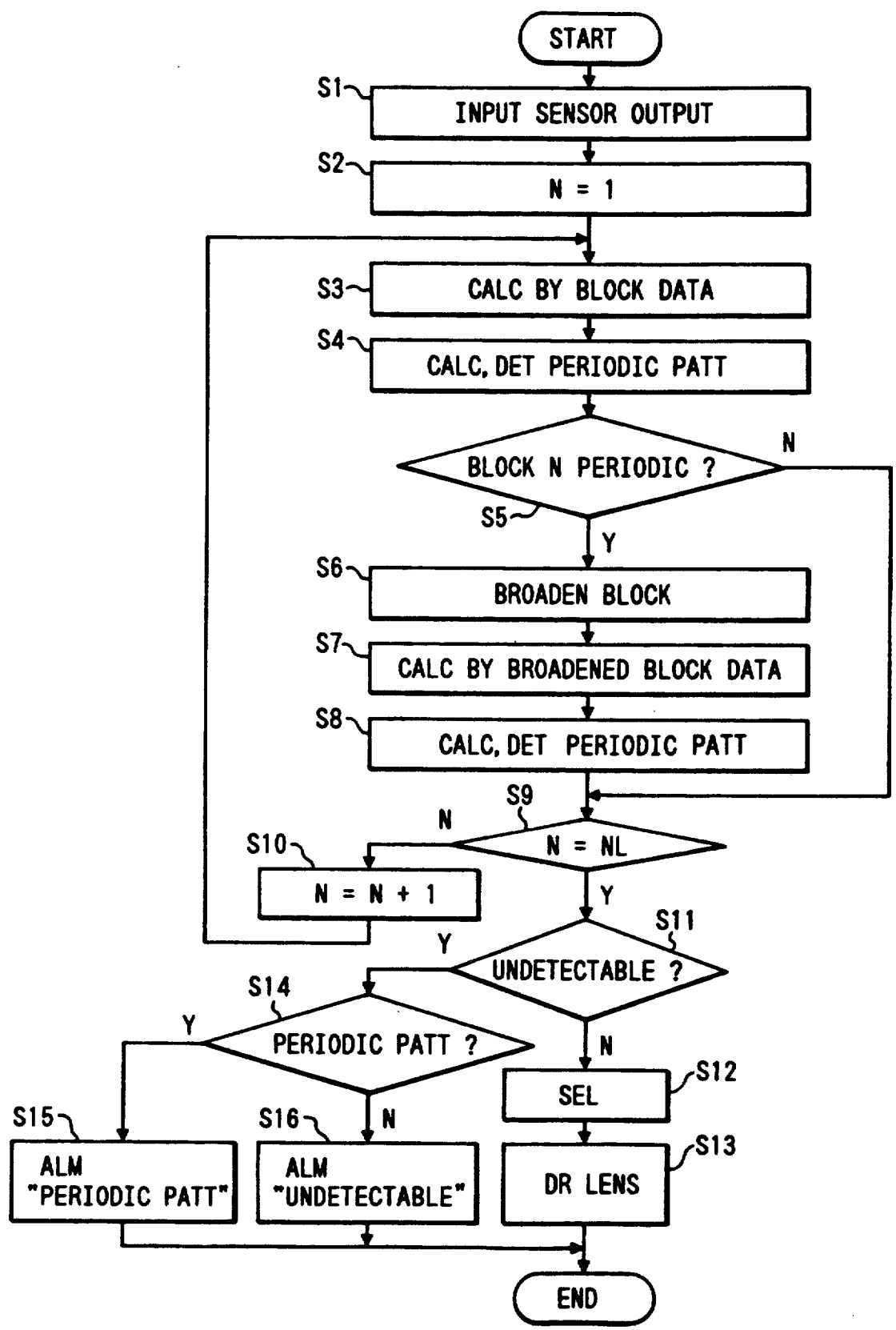
FIG. 13 is a flow chart showing the fifth embodiment of the present invention.
Figure 15:
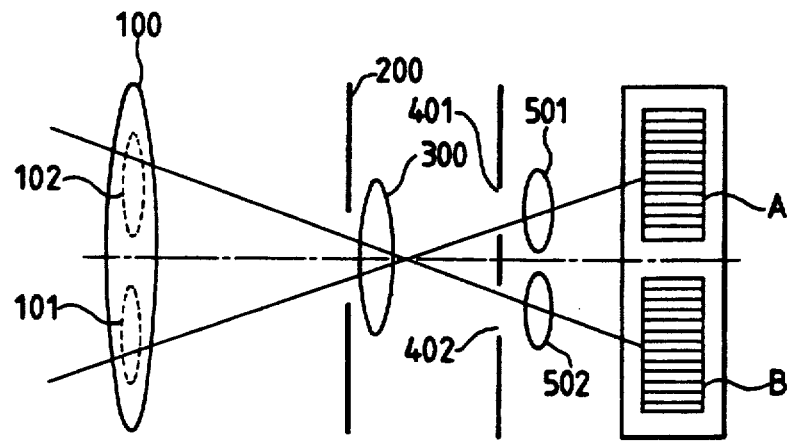
FIG. 15 is a view for explaining a conventional focus detecting optical system.
Figure 17A:
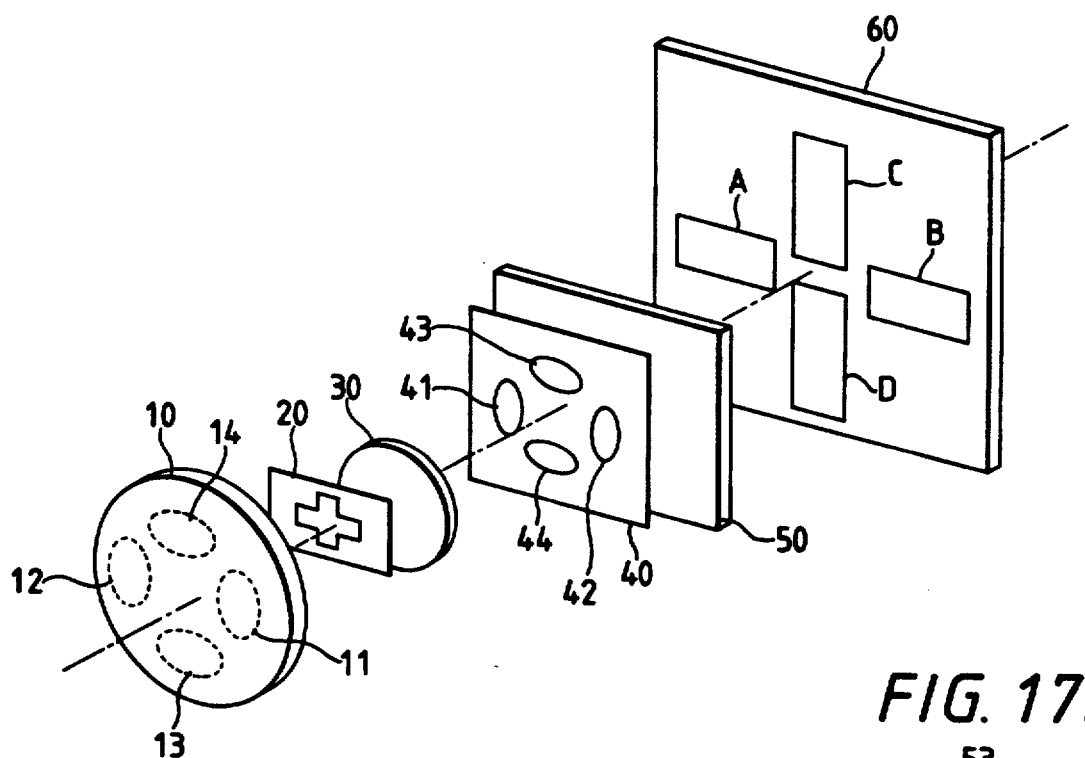
FIGS. 17A and 17B are views for explaining a conventional focus detecting optical system having horizontal and vertical focus detection ranges.
Figure 17B:
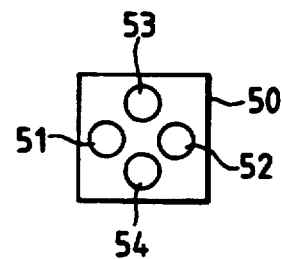
Figure 16A:
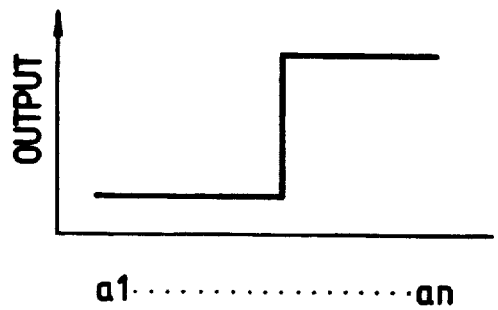
FIGS. 16A, 16B, 16C, and 16D are views for explaining conventional focus detection calculations.
Figure 16B:
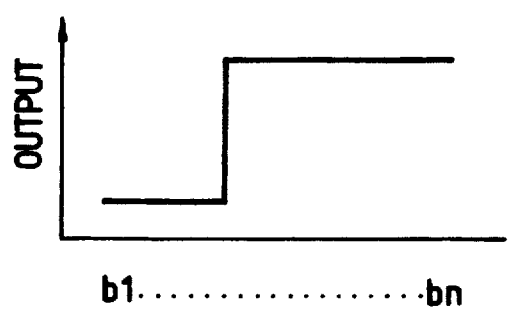
Figure 16C:
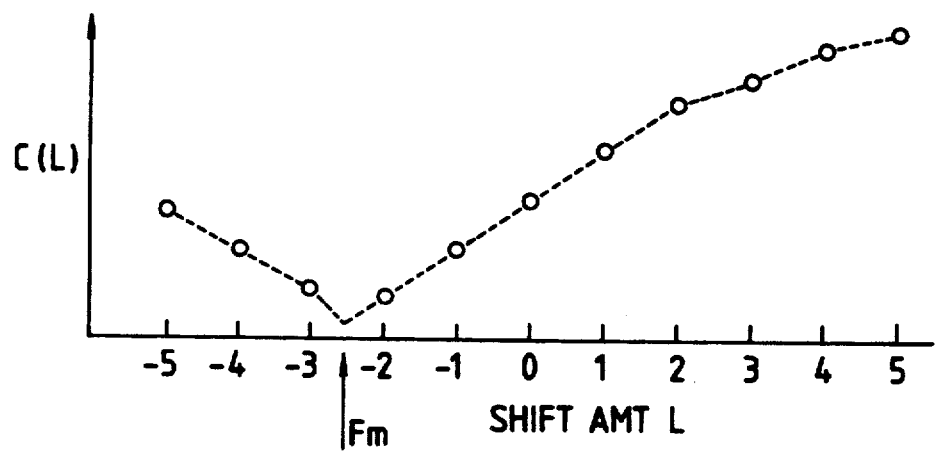
Figure 16D:
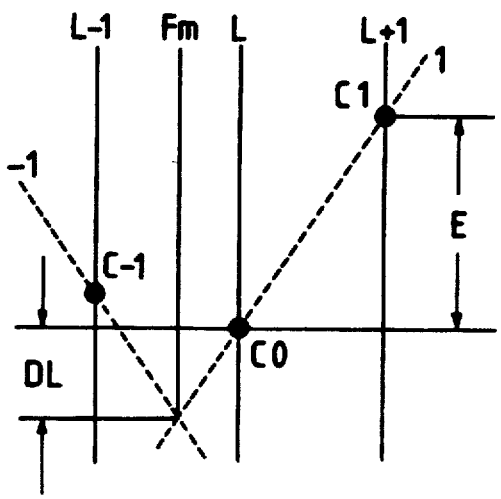
Figure 18A:
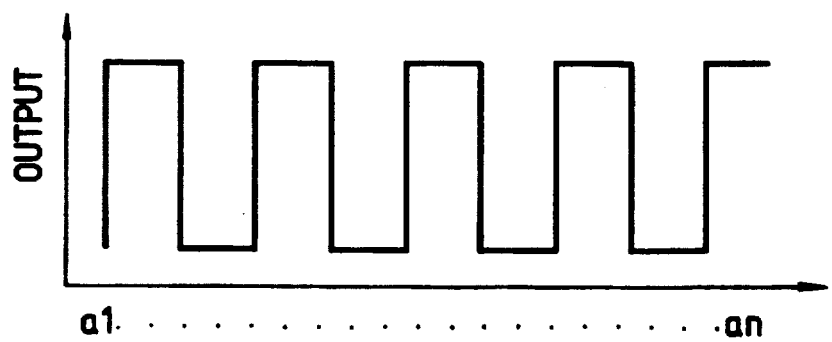
FIGS. 18A, 18B, and 18C are views for explaining a focus detection state when an object forms a periodic pattern.
Figure 18B:
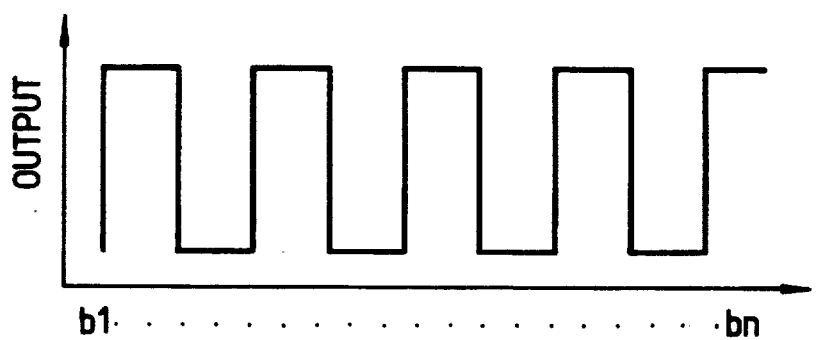
Figure 18C:
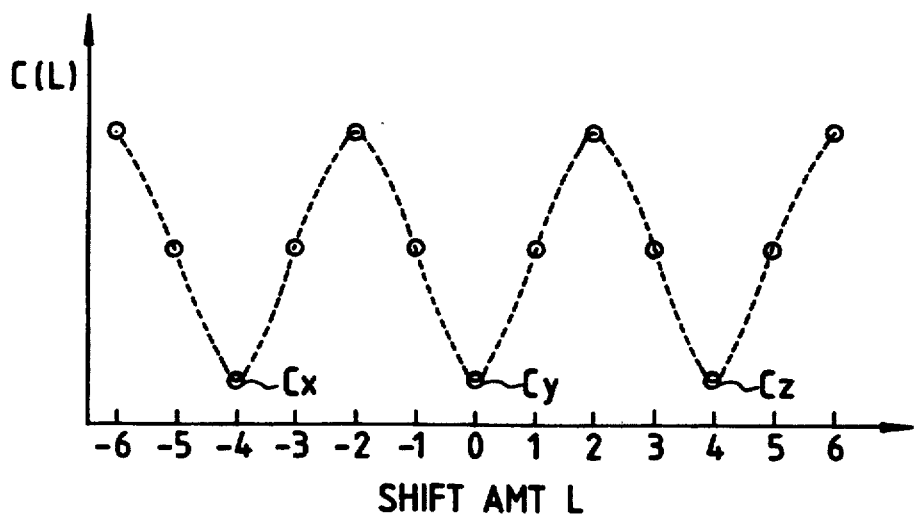

A focus detection apparatus shown in FIG. 1 includes an object-lens 1, a focus detecting optical system 2 shown in FIG. 13 or 15, and a pair of image sensor arrays 3. The image sensor arrays are aligned in one direction, as shown in FIG. 13, or are aligned in two directions, i.e., the horizontal and vertical directions, as shown in FIG. 15.

The apparatus also includes a calculating portion 4 which loads data from the image sensor arrays 3 and performs processing associated with defocus amount calculations such as correlation calculations, interpolation calculations, and the like. A judging portion 5 judges reliability of a defocus amount calculated by the calculating portion 4. A period (or periodic pattern) detecting portion 6 detects whether or not an object forms a periodic pattern. The apparatus also includes an indicating portion 7 for generating a focus undetectable alarm or a periodic pattern alarm, and a drive controller 8 for driving a motor 9 on the basis of the defocus amount calculated by the calculating portion 4.

A method of detecting whether or not an object forms a periodic pattern according to the present invention will be described below.

The first periodic pattern detection method is a method of determining that an object is a periodic pattern when there are defocus amounts satisfying Condition (1), i.e., a plurality of reliable defocus amounts. This method will be described below with reference to the flow chart of FIG. 2.

Figure 2:
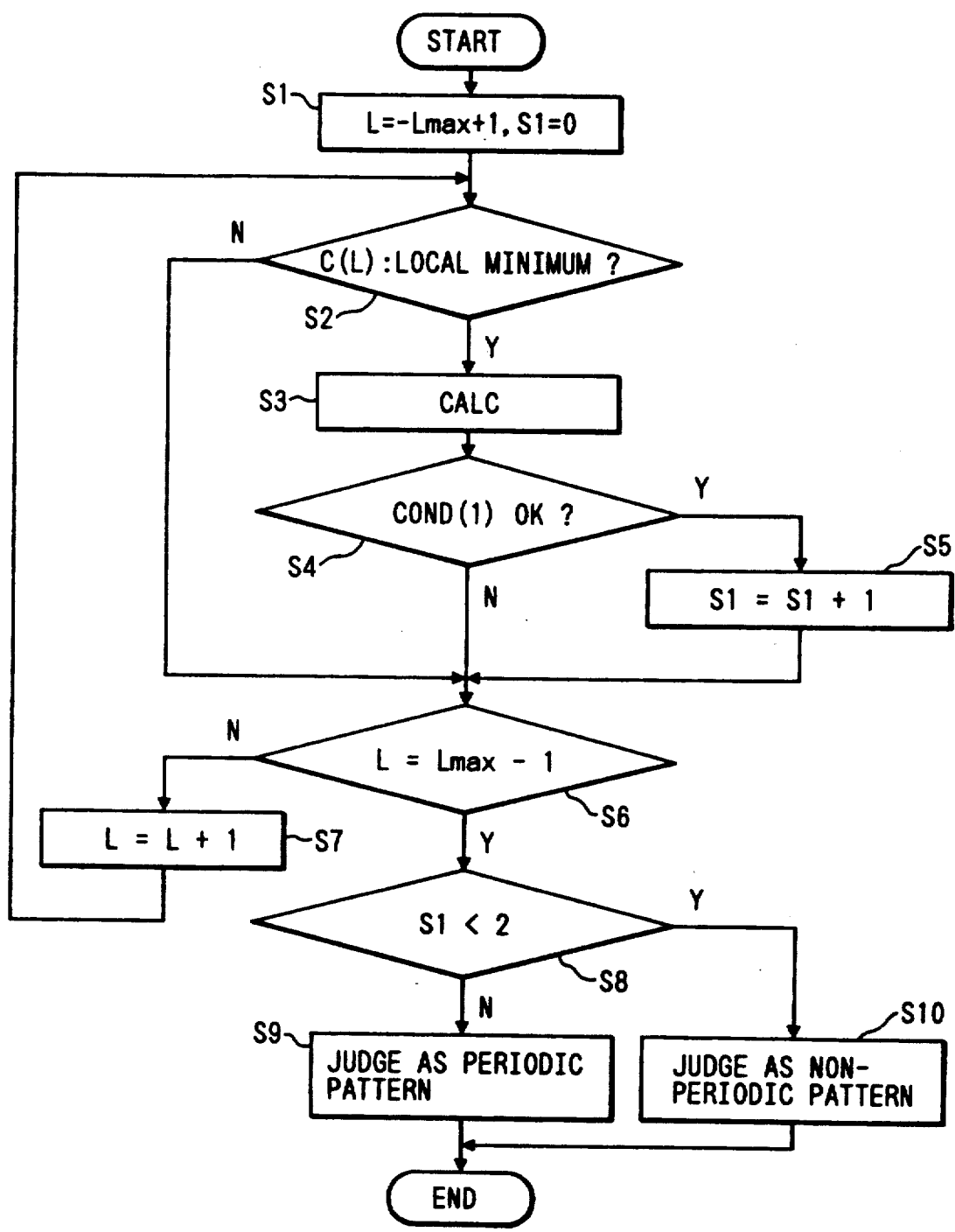
FIG. 2 is a flow chart showing a first method of detecting a periodic pattern according to the present invention.

Assume that correlation amounts C(L) have already been calculated by equations (1) described above within the range of shift amounts $L = -L_{max}$ to $L_{max}$ prior to the processing shown in FIG. 2.

In step 1, variables are initialized. More specifically, the shift amount L is set to be $L = -L_{max+1}$, and a counter S1 for counting the number of defocus amounts satisfying Condition (1) is set to be S1=0.

It is checked in step 2 if the correlation amount C(L) is a local minimum value, i.e., is smaller than correlation amounts C(L−1) and C(L+1) shifted from the amount C(L) by the same shift amount. If it is determined in step 2 that the correlation amount C(L) is a local minimum value, the flow advances to step 3, and interpolation calculations using equations (2) are made to calculate a defocus amount. It is then checked in step 4 if the defocus amount calculated in step 4 satisfies Condition (1). If YES (Y) in step 4, the content of the counter S1 is incremented by 1, and the flow advances to step 6. On the other hand, if NO (N) in step 4, the flow advances to step 6 without incrementing the content of the counter S1.

If it is determined in step 2 that the correlation amount C(L) is not a local minimum value, the flow advances to step 6 without performing interpolation calculations. It is checked in step 6 if the shift amount L is $L_{max-1}$. If NO in step 6, the shift amount L is incremented by one in step 7, and the flow returns to step 2. Thus, the same operations are repeated.

If it is determined in step 6 that $L = L_{max-1}$, the flow advances to step 8 to check if the content of the counter S1 is smaller than 2. When the content of the counter S1 is equal to or larger than 2, since an object may be a periodic pattern, a periodic pattern is judged in step 9. If the content of the counter S1 is smaller than 2, a non-periodic pattern is judged in step 10.

In the first periodic pattern detection method described above, when there are a plurality of defocus amounts which satisfy Condition (1) and are determined to be reliable, it is judged that an object is a periodic pattern.

However, when an object-lens is far from an in-focus state, object images formed on image sensor arrays are blurred, resulting in a low contrast. In this case, the above-mentioned values E of the plurality of defocus amounts become small as compared to an in-focus state, and vary around E1 as the threshold value of Condition (1). As a result, if so, no periodic pattern may be detected.

Thus, in a second periodic pattern detection method, Condition (2) which is broader than Condition (1) is set, and when a plurality of defocus amounts satisfying Condition (2) are generated, a periodic pattern is detected.

Condition (2) is as follows:

$E > E2$ and $C_{ex}/E < G2$ ($E2 < E1$, $G2 \geq G1$)
Condition (2)

Figure 3:
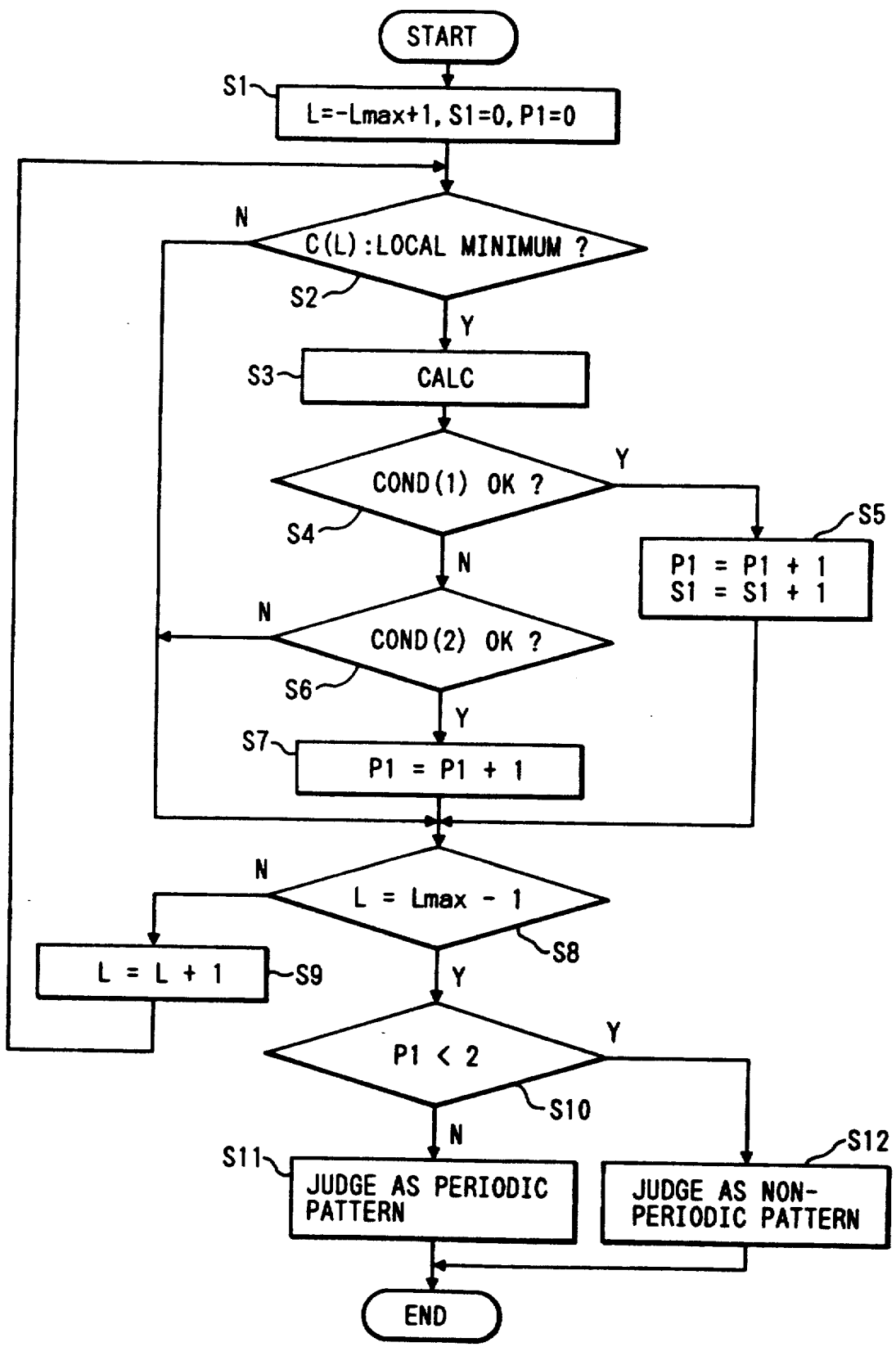
FIG. 3 is a flow chart showing a second method of detecting a periodic pattern according to the present invention.

The second periodic pattern detection method will be described below with reference to the flow chart shown in FIG. 3. Assume that correlation amounts C(L) have already been calculated by equations (1) within the range of shift amounts $L = -L_{max}$ to $L_{max}$ prior to the processing shown in FIG. 3.

In step 1, variables are initialized. In this case, the shift amount L is set to be $L = -L_{max+1}$, a counter S1 for counting the number of defocus amounts satisfying Condition (1) is set to be S1=0, and a counter P1 for counting the number of defocus amounts satisfying Condition (2) is set to be P1=0.

It is checked in step 2 if the correlation amount C(L) is a local minimum value, i.e., is smaller than correlation amounts C(L−1) and C(L+1) shifted from the amount C(L) by the same shift amount. If it is determined in step 2 that the correlation amount C(L) is a local minimum value, the flow advances to step 3, and interpolation calculations using equations (2) are made to calculate a defocus amount. It is then checked in step 4 if the defocus amount calculated in step 4 satisfies Condition (1). If YES in step 4, the content of the counter S1 is incremented by 1, and the flow advances to step 5. In step 5, the contents of the counters S1 and P1 are incremented by one each, and the flow advances to step 8. On the other hand, if NO in step 4, the flow advances to step 6 without incrementing the contents of the counters S1 and P1.

It is checked in step 6 if the defocus amount satisfies Condition (2). If YES in step 6, the content of the counter P1 is incremented by one in step 7, and the flow advances to step 8. However, if NO in step 6, the flow advances to step 8 without incrementing the content of the counter P1.

If it is determined in step 2 that the correlation amount C(L) is not a local minimum value, the flow advances to step 8 without performing interpolation calculations. It is checked in step 8 if the shift amount L is $L_{max-1}$. If NO in step 8, the shift amount L is incremented by one in step 9, and the flow returns to step 2. Thus, the same operations are repeated. If YES in step 8, the flow advances to step 10 to check if the content of the counter P1 is smaller than 2. When the content of the counter P1 is equal to or larger than 2, since an object may be a periodic pattern, a periodic pattern is judged in step 11. If the content of the counter P1 is smaller than 2, a non-periodic pattern is judged in step 12.

According to the second periodic pattern detection method described above, even when an object-lens is far from an in-focus state, a periodic pattern can be detected.

However, when an object is a periodic pattern, values F in the plurality of defocus amounts obtained by interpolation calculations have almost the same value, and hence, only one value cannot become larger than other values.

Therefore, when a defocus amount having a value E sufficiently larger than E1 is present, an object cannot always be judged as a periodic pattern although another defocus amount satisfying Condition (2) is detected.

Thus, in a third periodic pattern detection method, a periodic pattern is judged based on the number of defocus amounts satisfying Condition (2) like in the second periodic pattern detection method. When a defocus amount having a value E sufficiently larger than E1 is detected, a periodic pattern is detected based on the number of defocus amounts which satisfy a condition more strict than Condition (2).

Figure 4:
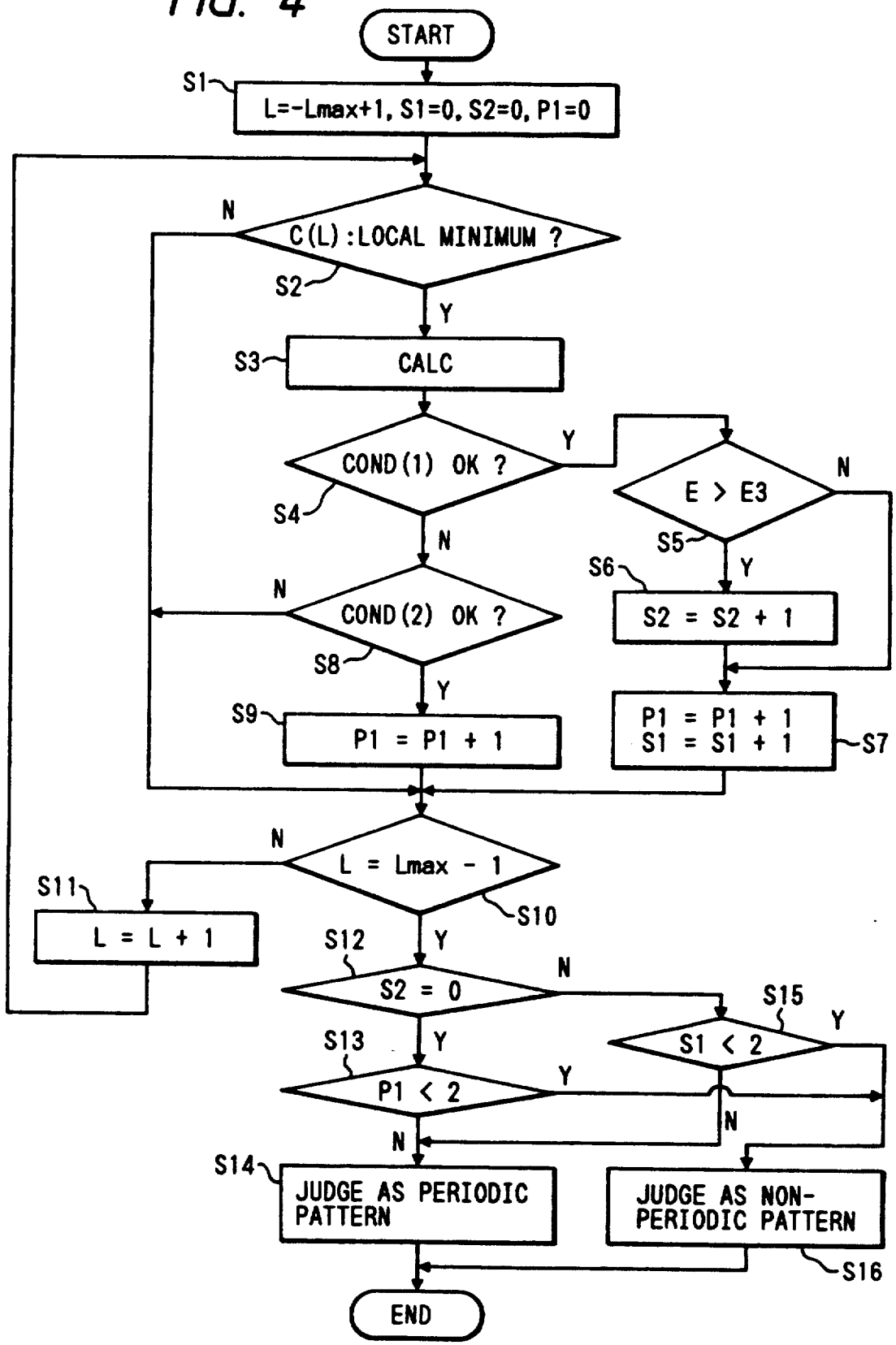
FIG. 4 is a flow chart showing a third method of detecting a periodic pattern according to the present invention.

The third periodic pattern detection method will be described below with reference to the flow chart of FIG. 4. As the condition more strict than Condition (2), Condition (1) described above is used. Assume that correlation amounts C(L) have already been calculated by equations (1) within the range of the shift amounts $L = -L_{max}$ to $L_{max}$ prior to the processing shown in FIG. 4.

In step 1, variables are initialized. In this case, the shift amount L is set to be $L = -L_{max+1}$, a counter S1 for counting the number of defocus amounts satisfying Condition (1) is set to be S1=0, a counter P1 for counting the number of defocus amounts satisfying Condition (2) is set to be P1=0, and a counter S2 for counting the number of defocus amounts satisfying a value E3 sufficiently larger than E1 is set to be S2=0.

It is checked in step 2 if the correlation amount C(L) is a local minimum value, i.e., is smaller than correlation amounts C(L−1) and C(L+1) shifted from the amount C(L) by the same shift amount. If it is determined in step 2 that the correlation amount C(L) is a local minimum value, the flow advances to step 3, and interpolation calculations using equations (2) are made to calculate a defocus amount. It is then checked in step 4 if the defocus amount calculated in step 4 satisfies Condition (1). If YES in step 4, the content of the counter S1 is incremented by 1, and the flow advances to step 5; otherwise, the flow advances to step 8. It is checked in step 5 if the value E is larger than E3. If YES in step 5, the content of the counter S2 is incremented by one, and the flow advances to step 7. If NO in step 5, the flow advances to step 7 without incrementing the content of the counter S2. In step 7, the contents of the counters P1 and S1 are incremented by one each, and the flow advances to step 10.

If it is determined in step 4 that Condition (1) is not satisfied, it is checked in step 8 if the local minimum value $C_{ex}$ satisfies Condition (2). If YES in step 8, the flow advances to step 9. In step 9, the content of the counter P1 is incremented by one, and the flow advances to step 10. If NO in step 8, the flow advances to step 10 without incrementing the content of the counter P1.

If it is determined in step 2 that the correlation amount C(L) is not a local minimum value, the flow advances to step 10 without performing interpolation calculations. It is checked in step 10 if the shift amount L is $L_{max-1}$. If NO in step 10, the shift amount L is incremented by one in step 11, and the flow returns to step 2. Thus, the same operations are repeated.

If YES in step 10, the flow advances to step 12 to check if the content of the counter S2 is 0. When the counter S2=0, this means that there is no defocus amount having the value E sufficiently larger than E1. In this case, a periodic pattern must be detected based on the number of defocus amounts satisfying Condition (2), i.e., the content of the counter P1. The flow then advances to step 13 to check if the content of the counter P1 is smaller than 2. If NO in step 13, the flow advances to step 14, and an object is judged as a periodic pattern. However, if YES in step 13, the flow advances to step 16, and an object is judged as a non-periodic pattern.

If it is determined in step 12 that the counter S2 ≠ 0, this means that there is a defocus amount having the value E sufficiently larger than E1. In this case, a periodic pattern must be detected based on the number of defocus amounts satisfying Condition (1), i.e., the content of the counter S1. Therefore, the flow advances to step 15 to check if the content of the counter S1 is smaller than 2. If NO in step 15, the flow advances to step 14, and an object is judged as a periodic pattern. However, if YES in step 15, the flow advances to step 16, and an object is judged as a non-periodic pattern.

In the third periodic pattern detection method described above, it is checked in step 5 if a value E is larger than E3. In this case, a condition for checking whether or not a value G is smaller than G3 which is smaller than G1 may be added.

When a defocus amount having the value E exceeding the value E3 is detected, a periodic pattern is detected based on the number of defocus amounts satisfying Condition (1) in this case. A condition used in this case need only be more strict than Condition (2). Therefore, this condition may be set to be broader or more strict than Condition (1) depending on the value E3.

Furthermore, a condition for detecting a periodic pattern is switched between two conditions, i.e., Conditions (1) and (2) depending on whether or not a defocus amount having the value E exceeding the value E3 is detected. In this case, the number of conditions to be switched may be increased to achieve more accurate periodic pattern detection.

Embodiments wherein the above-mentioned periodic pattern detection methods are applied to a focus detection apparatus will be described below.

Figure 5A:
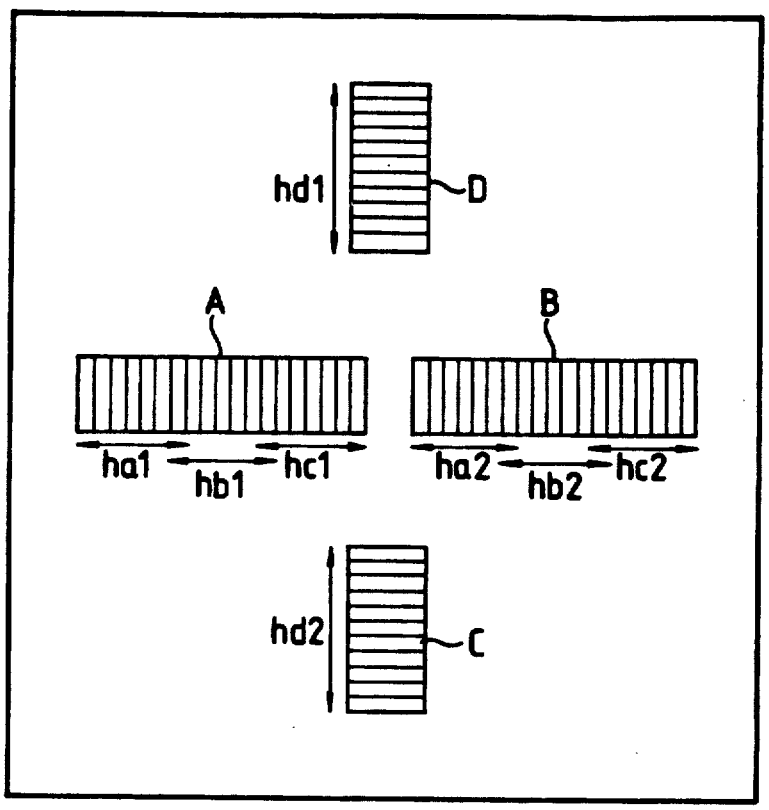
FIGS. 5A and 5B are views for explaining image sensor arrays according to the present invention.

The first embodiment of the present invention is applied to a focus detection apparatus arranged as follows. That is, as shown in FIG. 5A, two pairs of image sensor arrays A and B, and C and D are respectively arranged in two directions, i.e., the horizontal and vertical directions. Each of the image sensor arrays A, B, C, and D is divided into a plurality of blocks to segment an object image, and focus detection calculations are made for each block.

Figure 5B:
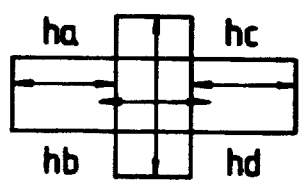

As a result of the focus detection calculations, assume that one of blocks which performs focus detection in regions including common regions on a predicted focal plane of an object-lens like blocks hb and hd, as shown in FIG. 5B is a periodic pattern, and the other block is a non-periodic pattern. In this case, of a plurality of defocus amounts calculated by one block as the periodic pattern, a defocus amount falling within a predetermined range having a defocus amount calculated by the other block as the center is selected, and is determined as a defocus amount of one block as the periodic pattern.

As for blocks ha, hb, and hc aligned in the same direction, assume that an arbitrary block is a periodic pattern and a block adjacent to the arbitrary block is a non-periodic pattern. In this case, of a plurality of defocus amounts calculated by the block as the periodic pattern, a defocus amount falling within a predetermined range having a defocus amount calculated by the adjacent block as the center is selected, and is determined as a defocus amount of the block as the periodic pattern.

Focus detection processing according to the first embodiment of the present invention will be described below with reference to the flow chart of FIG. 6.

In this embodiment, each horizontal image sensor array has NY blocks 1 to NY, and each vertical image sensor array has (NL−NT+1) blocks NT to NL. In this case, a horizontal block NH and a vertical block NV have an orthogonal relationship including a common region on an object-lens like the blocks hb and hd shown in FIG. 5B.

Figure 6:
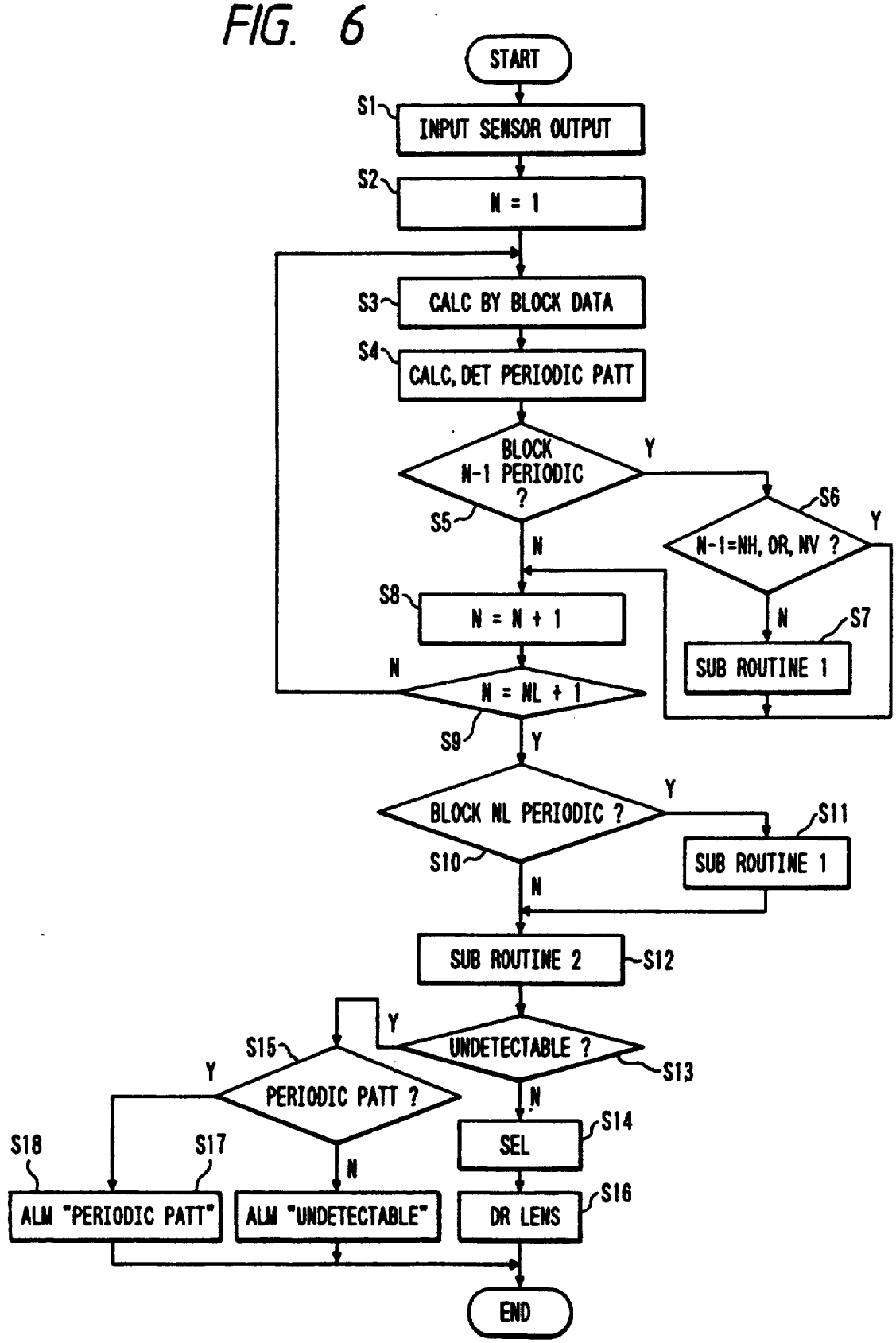
FIG. 6 is a flow chart showing the first embodiment of the present invention.

In FIG. 6, photoelectric conversion signals from the image sensor arrays are input to the calculating portion in step 1. In step 2, "1" is set in a variable N indicating a block number for performing focus detection calculations. The flow then advances to step 3 to calculate correlation amounts C(L) by equations (1) within a predetermined range of $-L_{max}$ to $L_{max}$ using data in the Nth block. The range of the shift amount may be changed for each block.

In step 4, interpolation calculations and periodic pattern detection are performed by one of the above-mentioned three periodic pattern detection methods.

In step 5, it is checked if a block N-1 immediately preceding a block N for which focus detection calculations are being performed is a periodic pattern. If YES in step 5, the flow advances to step 6 to check if the immediately preceding block N-1 is a horizontal or vertical block NH or NV in the common region. If NO in step 6, the flow advances to step 8 via processing in SUB ROUTINE 1 in step 7 (to be described later). If YES in step 6, the flow advances to step 8 without executing SUB ROUTINE 1.

SUB ROUTINE 1 is not executed when the immediately preceding block N-1 is the horizontal or vertical block NH or NV in the common region due to the following reason. That is, when one of the blocks NH and NV is a periodic pattern, a defocus amount of a block as the periodic pattern is determined on the basis of a defocus amount of the other block, as described above. Contrary to this, SUB ROUTINE 1 is executed to determine a defocus amount of the block N-1 on the basis of defocus amounts of the two adjacent blocks when the immediately preceding block N-1 is a periodic pattern, as will be described later.

If it is determined in step 5 that the immediately preceding block N-1 is not a periodic pattern, the flow advances to step 8. If a block is an initial block having a block number N=1, since there is no immediately preceding block N-1, the flow also advances to step 8.

In step 8, the present block number N is incremented by one. In step 9, it is checked if the block number N is a horizontal limit value NL+1. If NO in step 9, the flow returns to step 3, and operations such as focus detection calculations are similarly executed for a block having the number N+1 incremented in step 8. If the block number N=NL+1, since there are no more blocks, the flow advances to step 10. In step 10, it is checked if the block having the number NL as the last block is a periodic pattern. If YES in step 10, the flow advances to step 12 via processing of SUB ROUTINE 1 in step 11; otherwise, the flow advances to SUB ROUTINE 2 in step 12 without executing SUB ROUTINE 1.

In step 12, processing of SUB ROUTINE 2 for checking if the horizontal or vertical block NH or NV as the common region is a periodic pattern and for determining a defocus amount of a block as the periodic pattern is executed. The operations of SUB ROUTINE 2 will be described later.

The flow then advances to step 13 to check if focus detection is disabled. The focus detection is disabled when there are no blocks from which defocus amounts satisfying Condition (1) are obtained and when all the blocks satisfying Condition (1), if any, are periodic patterns.

If YES in step 13, the flow advances to step 15 to check if there is a block as a periodic pattern. If YES in step 15, a periodic pattern alarm is generated in step 18; otherwise, a focus undetectable alarm is generated in step 17.

If it is determined in step 13 that focus detection is enabled, the flow advances to step 14. In step 14, of a plurality of defocus amounts obtained by performing focus detection calculations in a plurality of blocks, a defocus amount, which satisfies a predetermined condition like an object at a closest distance, is selected. In step 16, the object-lens is driven based on the selected defocus amount.

In this embodiment, one of a plurality of defocus amounts is selected in step 14. Alternatively, defocus amounts giving almost the same value may be grouped, defocus amounts of blocks belonging to the group may be weighted and averaged by the value E, and one of a plurality of defocus amounts calculated by weighting and averaging may be selected to drive the object-lens.

SUB ROUTINE 1 in steps 7 and 11 in FIG. 6 will be described in detail below with reference to the flow chart of FIG. 7.

In SUB ROUTINE 1, when a block N-1 immediately preceding the present block number N is a periodic pattern, if one of adjacent blocks N-2 or N is a non-periodic pattern, one of a plurality of defocus amounts of the block N-1 which is present within a predetermined range centered on a defocus amount of the block N-2 or N as the non-periodic pattern is selected as the defocus amount of the block N-1. If neither the adjacent blocks N-2 nor N are periodic blocks, one of defocus amounts, which is present in a predetermined range centered on a defocus amount of each of the adjacent blocks N-2 and N, is extracted. Then, one of the two extracted defocus amounts, which satisfies a predetermined condition, is selected.

Figure 7:
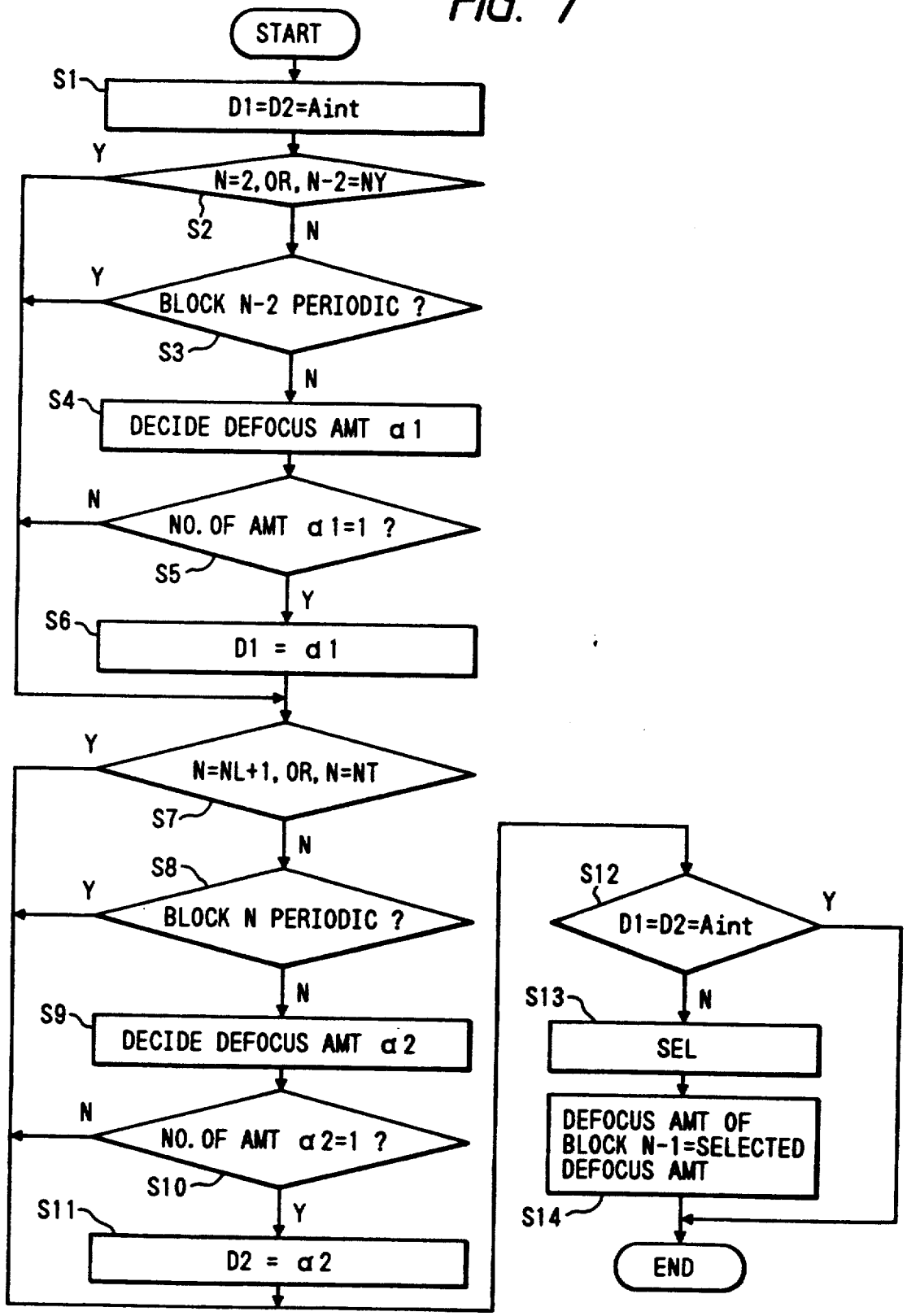
FIG. 7 is a flow chart showing SUB ROUTINE 1 in FIG. 6.

In FIG. 7, memories D1 and D2 for storing defocus amounts are initialized in step 1. As an initial value of the memories D1 and D2, a sufficiently large numerical value falling outside the range of the shift amounts $-L_{max}$ to $L_{max}$, i.e., a value exceeding a defocus amount detection capability is preferable. In this case, D1=D2=Aint is set. The flow advances to step 2 to check if the value N indicating a block number is N=2 or a block N-2 before the immediately preceding block is N-2 =NY. If this condition is satisfied, the flow jumps to step 7; otherwise, the flow advances to step 3. If the block number N=2, a periodic pattern of a block N=0 which does not exist must be checked in step 3. Therefore, the flow jumps to step 7 when N=2.

If N-2 =NY, i.e., the last horizontal block, an adjacent block N-1 is a first vertical block. Therefore, the blocks N-2 and N-1 are not adjacent to each other. In this case, the flow also jumps to step 7.

In step 3, it is checked if the block N-2 is a periodic pattern. If YES in step 3, the flow jumps to step 7; otherwise, the flow advances to step 4.

In step 4, of a plurality of defocus amounts having a periodic pattern, a defocus amount ($\alpha$1) which is present in a predetermined range centered on a defocus amount of the block N-2 having no periodic pattern is extracted. A defocus amount to be extracted must have high reliability and satisfy Condition (1). Of course, the defocus amount of the block N-2 must satisfy Condition (1).

In step 5, it is checked if the number of defocus amounts ($\alpha$1) of the block N-2 extracted based on the defocus amount of the block N-1 is 1. If YES in step 5, the extracted defocus amount is stored in the memory D1 in step 6, and the flow advances to step 7; otherwise, the flow advances to step 7 without storing the defocus amount.

In step 7, it is checked if the block number N indicates a horizontal limit value NL+1 or a vertical initial value NT. If YES in step 7, the flow jumps to step 12; otherwise, the flow advances to step 8.

In this case, if the block number N=NL+1, a block NL+1 which does not exist must be checked in step 8. Therefore, when N=NL+1, the flow jumps to step 12.

When the block number N=NT, i.e., the vertical first block, an immediately preceding block is a last horizontal block, and the blocks N and N-1 are not adjacent to each other. In this case, the flow also jumps to step 12.

In step 8, it is checked if the block N is a periodic pattern. If YES in step 8, the flow jumps to step 12; otherwise, the flow advances to step 9. In step 9, of a plurality of defocus amounts of the block N-1 as the periodic pattern, a defocus amount ($\alpha 2$) which is present in a predetermined range centered on a defocus amount of the block N having no periodic pattern is extracted. In this case, the defocus amount extracted in the block N-1 must have high reliability and satisfy Condition (1). Of course, the defocus amount of the block N must satisfy Condition (1).

It is checked in step 10 if the number of defocus amounts ($\alpha 2$) extracted in step 10 is 1. If YES in step 10, the extracted defocus amount is stored in the memory D2 in step 11, and the flow advances to step 12; otherwise, the flow advances to step 12 without storing the defocus amount. It is checked in step 12 if the contents of the memories D1 and D2 satisfy D1=D2=Aint.

If D1=D2=Aint is not satisfied, this means that a defocus amount of the block N-1 which satisfies the condition in step 9 is present. Therefore, the defocus amounts stored in the memories D1 and D2 are compared in step 13 to select one which satisfies a certain condition. The selection condition in step 13 is as follows. For example, the certain condition is to select a shorter distance. Alternatively, a difference between the defocus amounts of the block N-2 and the memory D1 is compared with a difference between the defocus amounts of the block N and the memory D2, and a smaller one is selected, or when the value E of the block N-2 is larger than that of the block N, the defocus amount of the memory D1 is selected; otherwise, the defocus amount of the memory D2 is selected.

The defocus amount selected in this manner is finally determined as that of the block N-1 in step 14.

In steps 5 and 10 in FIG. 7, it is checked if the number of defocus amounts of the block N-1 which fall within a predetermined range having a defocus amount of the block N-2 or N as the center is 1. When the predetermined range is set to be smaller than a minimum unit of a detectable defocus amount restricted by the pitch of the photoelectric transducers of the image sensor arrays A, B, C, and D (FIG. 5A) when no interpolation calculations are made, a plurality of defocus amounts do not exit in this range. Therefore, in judging steps 5 and 10 in FIG. 7, it need only be checked if a defocus amount is present in the predetermined range.

In FIG. 7, when a block adjacent to a block of a periodic pattern is a non-periodic pattern, if one defocus amount of the block as the periodic pattern is present in a predetermined range having the defocus amount of the adjacent block as the center, the one defocus amount is adopted as the defocus amount of the block as the periodic pattern. Alternatively, a defocus amount closest to the defocus amount of the adjacent block may be adopted. In this case, a condition that the absolute value of the closest defocus amount falls within a predetermined range may be added.

SUB ROUTINE 2 in step 12 of FIG. 6 will be described in detail below with reference to the flow chart of FIG. 8.

In SUB ROUTINE 2, whether or not the horizontal and vertical blocks NH and NV are periodic patterns is checked to determine a defocus amount of a block as a periodic pattern.

Figure 8:
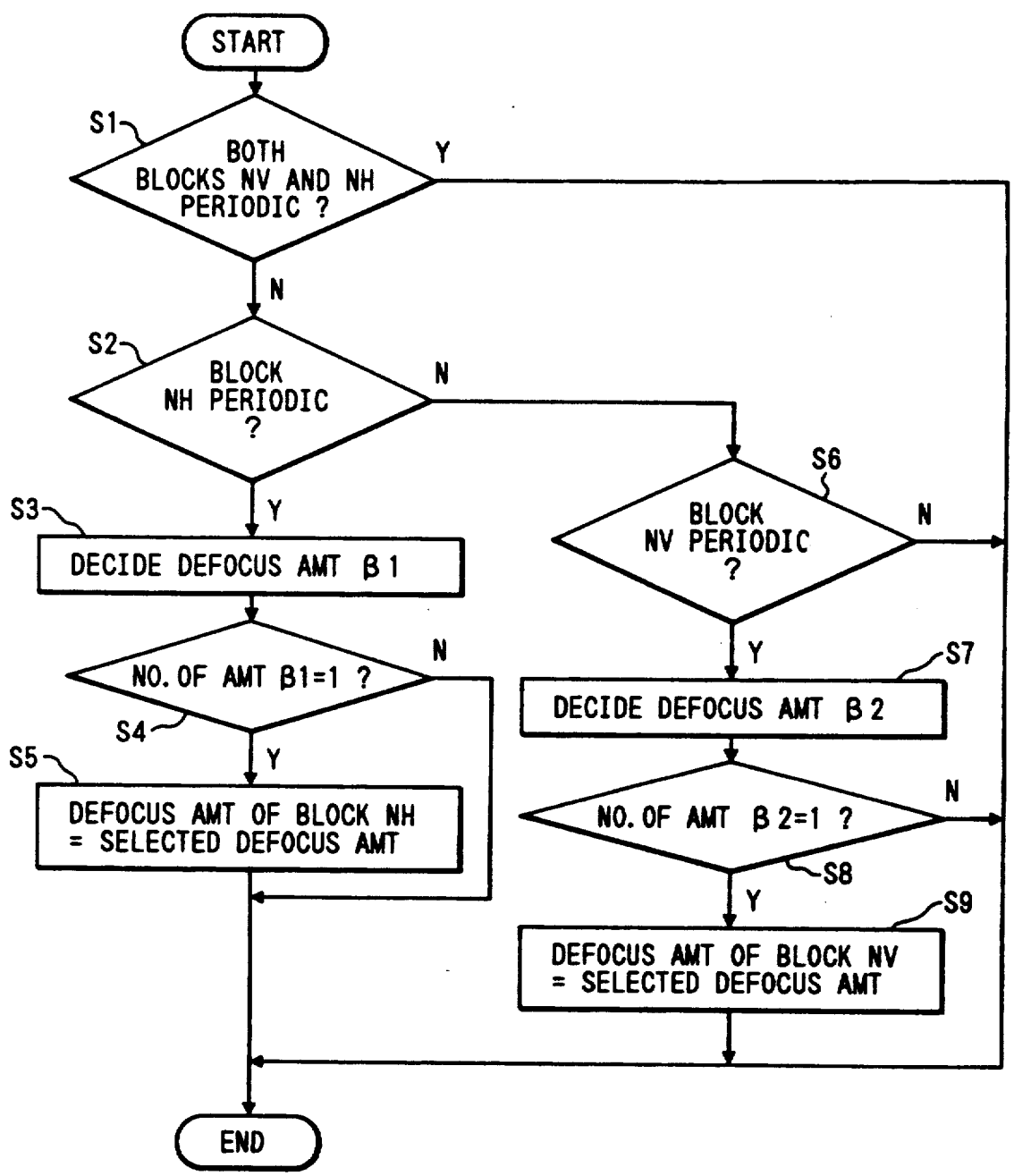
FIG. 8 is a flow chart showing SUB ROUTINE 2 in FIG. 6.
Figure 9A:
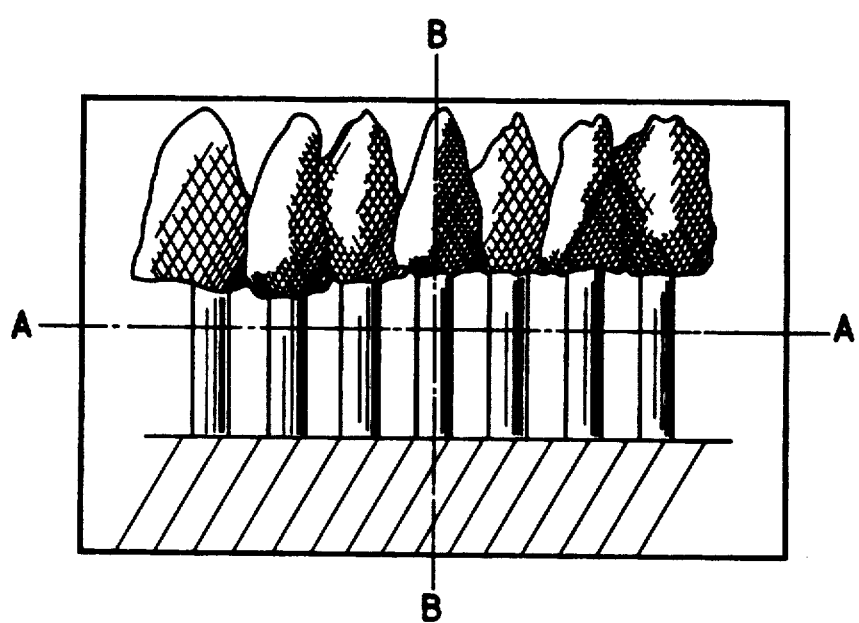
FIGS. 9A, 9B, and 9C are views for explaining objects forming a horizontal periodic pattern.
Figure 9C:
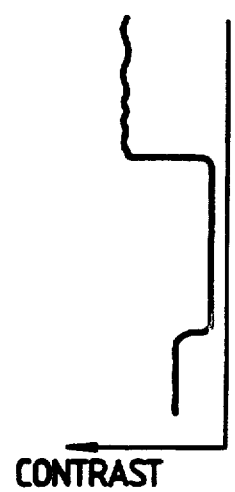
Figure 9B:
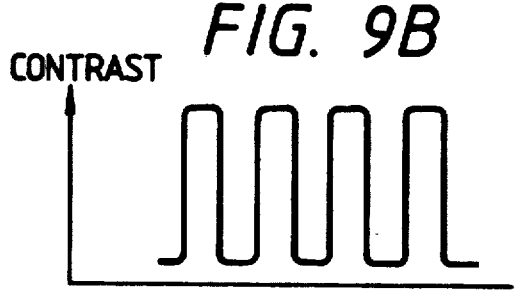

More specifically, as shown in FIGS. 9A to 9C, in general, a periodic pattern is formed when objects (e.g., trees) which extend vertically are periodically aligned in the horizontal direction like a row of trees. Such objects tend not to simultaneously form periodic patterns in both the horizontal and vertical directions. A contrast along a horizontal line A—A in FIG. 9A periodically changes, as shown in FIG. 9B. However, a contrast along a vertical line B—B does not periodically change, as shown in FIG. 9C. Therefore, when focus detection is performed based on the horizontal contrast shown in FIG. 9B, correlation amounts C(L) include a plurality of local minimum values, and, hence, a plurality of defocus amounts are calculated. Of the plurality of defocus amounts, a true defocus amount should exhibit substantially the same value as that obtained by focus detection based on the vertical contrast shown in FIG. 9C. In SUB ROUTINE 2 shown in FIG. 8, a true defocus amount is obtained on the basis of the above-mentioned fact even from a periodic pattern.

In FIG. 8, it is checked in step 1 if both the horizontal and vertical blocks NH and NV are periodic patterns. If YES in step 1, the flow immediately exits SUB ROUTINE 2; otherwise, the flow advances to step 2 to check if the horizontal block NH is a periodic pattern.

If YES in step 2, since the vertical block NV is not a periodic pattern, the flow advances to step 3. In step 3, a defocus amount ($\beta 1$) of the horizontal block NH which is present in a predetermined range having the defocus amount of the vertical block NV as the center is extracted. If it is determined in step 4 that the number of extracted defocus amounts is 1, the extracted defocus amount is determined as that of the horizontal block NH in step 5, and the flow exits SUB ROUTINE 2.

If it is determined in step 4 that two or more defocus amounts are extracted or no defocus amount is extracted, the flow exits SUB ROUTINE 2.

Both a defocus amount to be extracted and the defocus amount of the vertical block NV must have high reliability and satisfy Condition (1).

If it is determined in step 2 that the horizontal block NH is not a periodic pattern, the flow advances to step 6 to check if the vertical block NV is a periodic pattern. If NO in step 6, since neither the blocks NH nor NV are periodic patterns, the flow exits SUB ROUTINE 2.

However, if YES in step 6, since it has already been determined in step 2 that the horizontal block NH is not a periodic pattern, a defocus amount of the vertical block NV which falls within a predetermined range having the defocus amount of the horizontal block NH as the center is extracted in step 7. If it is determined in step 8 that the number of extracted defocus amounts is 1, the extracted defocus amount is determined as that of the vertical block NV in step 9, and the flow exits SUB ROUTINE 2. If it is determined in step 8 that two or more defocus amounts are extracted or no defocus amount is extracted, the flow exits SUB ROUTINE 2.

Both a defocus amount to be extracted and the defocus amount of the horizontal block NH must have high reliability and satisfy Condition (1).

In steps 4 and 8 in FIG. 8 described above, it is checked if the number of defocus amounts of one of the horizontal and vertical blocks, which fall within a predetermined range having a defocus amount of the other block as the center, is 1. When the predetermined range set to be smaller than a minimum unit of a detectable defocus amount restricted by the pitch of the photoelectric transducers of the image sensor arrays A, B, C, and D (FIG. 5A) when no interpolation calculations are made, a plurality of defocus amounts do not exit in this range. Therefore, in judging steps 4 and 8, it need only be checked if a defocus amount is present in the predetermined range.

In FIG. 8, when one of the horizontal and vertical blocks NH and NV is a periodic pattern and the other block is not a periodic pattern, if one defocus amount of the block as the periodic pattern is present in a predetermined range having the defocus amount of the block as the non-periodic pattern as the center, one defocus amount is adopted as the defocus amount of the block having the periodic pattern. Alternatively, a defocus amount closest to the defocus amount of the block as the non-periodic pattern may be adopted. In this case, a condition that the absolute value of the closest defocus amount falls within a predetermined range may be added.

Furthermore, in FIG. 8, when both the horizontal and vertical blocks NH and NV are periodic patterns, the flow immediately exits SUB ROUTINE 2 and no defocus amount is determined. Alternatively, as in SUB ROUTINE 1 in FIG. 7, if an adjacent block in the same direction is not a periodic pattern, a defocus amount may be determined on the basis of the defocus amount of the adjacent block.

The second embodiment of the present invention will be described below.

The second embodiment is applied to a focus detection apparatus arranged as follows. That is, a pair of image sensor arrays are arranged in one direction corresponding to, e.g., the horizontal direction, and each of the pair of image sensor arrays is divided into a plurality of blocks to segment an object image, and focus detection calculations are performed for each block.

When an arbitrary block is a periodic pattern and a block adjacent to the arbitrary block is not a periodic pattern, a defocus amount which falls within a predetermined range centered on a defocus amount calculated in the adjacent block is selected from a plurality of defocus amounts calculated in the block as the periodic pattern. The selected defocus amount is determined as that of the block as the periodic pattern.

The second embodiment will be described in detail below with reference to FIG. 10. In the second embodiment, each image sensor array has NL blocks 1 to NL.

In step 1, photoelectric conversion signals from the image sensor arrays are input to the calculating portion. In step 2, a variable N indicating a block number for which focus detection calculations are performed is set to be N=1. In step 3, correlation amounts C(L) are calculated by equations (1) within a predetermined range of $-L_{max}$ to $L_{max}$ using data in the Nth block. The range of the shift amount may be changed for each block.

In step 4, interpolation calculations and periodic pattern detection are performed by one of the above-mentioned three periodic pattern detection methods. In step 5, it is checked if a block N-1 immediately preceding a block N for which focus detection calculations are being performed is a periodic pattern. If YES in step 5, the flow advances to step 7 via the processing of SUB ROUTINE 1 (FIG. 7) in step 6; otherwise, the flow directly advances to step 7.

If the block number N=1 in step 5, since there is no immediately preceding block, the flow advances to step 7.

In step 7, the block number N is incremented by one. It is then checked in step 8 if the block number N=NL+1. If NO in step 8, the flow returns to step 3, and operations such as focus detection calculations are executed for the block having the number updated in step 7; otherwise, since there are no more blocks, the flow advances to step 9. It is checked in step 9 if the last block NL is a periodic pattern. If YES in step 9, the flow advances to step 11 via the processing of SUB ROUTINE 1 in step 10; otherwise, the flow advances to step 11.

It is checked in step 11 if focus detection is disabled. The focus detection is disabled when there are no blocks from which defocus amounts satisfying Condition (1) are obtained and when all the blocks satisfying Condition (1), if any, are periodic patterns.

If YES in step 11, the flow advances to step 13 to check if there is a block as a periodic pattern. If YES in step 13, a periodic pattern alarm is generated in step 16; otherwise, a focus undetectable alarm is generated in step 15.

If it is determined in step 11 that focus detection is enabled, the flow advances to step 12. In step 12, of a plurality of defocus amounts obtained by performing focus detection calculations in a plurality of blocks, a defocus amount, which satisfies a predetermined condition like an object at a closest distance, is selected. In step 14, the object-lens is driven based on the selected defocus amount.

In the embodiment shown in FIG. 10, one of a plurality of defocus amounts is selected in step 12. Alternatively, defocus amounts giving almost the same value may be grouped, defocus amounts of blocks belonging to the group may be weighted and averaged by the value E, and one of a plurality of defocus amounts calculated by weighting and averaging may be selected to drive the object-lens.

The operation of SUB ROUTINE 1 in FIG. 10 is basically the same as that shown in FIG. 7, except that since there are no vertical image sensor arrays, it need not be checked in step 2 in FIG. 7 if N-2=NY, and it need not be checked in step 7 if N=NT. Thus, a detailed description thereof will be omitted.

The third embodiment of a focus detection apparatus according to the present invention will be described below. The third embodiment is applied to a focus detection apparatus arranged as follows. That is, image sensor arrays are arranged in a plurality of directions, i.e., in the horizontal and vertical directions, and are not divided into a plurality of blocks, so that focus detection is performed to have the arrays in each direction as one block.

If a block in one direction is a periodic pattern and a block in the other direction is a non-periodic pattern, a defocus amount which falls within a predetermined range centered on one defocus amount calculated in the block in the other direction is selected from a plurality of defocus amount calculated in the block in one direction. The selected defocus amount is determined as that of the block in one direction as the periodic pattern.

The third embodiment will be described in detail below with reference to FIG. 11.

In step 1, photoelectric conversion signals from the image sensor arrays are input to the calculating portion. In step 2, correlation amounts C(L) are calculated by equations (1) within a predetermined range of $-L_{max}$ to $L_{max}$ using data of the horizontal image sensor arrays.

In step 3, interpolation calculations and periodic pattern detection are performed by one of the above-mentioned three periodic pattern detection methods. It is checked in step 4 if a reliable defocus amount, i.e., a defocus amount satisfying Condition (1) is calculated. In this checking operation, if the content of a counter S1 for counting the number of defocus amounts which satisfy Condition (1) is 0, it is determined that no defocus amount is calculated; if $S1 \geq 1$, it is determined that the defocus amount is calculated.

If there is a defocus amount satisfying Condition (1), it is checked in step 5 if a horizontal block is a periodic pattern. Whether or not an object is a periodic pattern has already been detected in step 3. Therefore, if YES in step 5, the flow advances to step 7, focus detection calculations are performed using data from the vertical image sensor arrays. However, if NO in step 5, the flow advances to step 6, and an object-lens is driven based on the defocus amount calculated in step 3.

If it is determined in step 4 that there is no defocus amount satisfying Condition (1), the flow advances to step 7. In step 7, correlation amounts C(L) are calculated by equations (1) within a predetermined range of $-L_{max}$ to $L_{max}$ using data of the vertical image sensor arrays.

The flow then advances to step 9 to check if a vertical block is a periodic pattern. If NO in step 9, the flow advances to step 10; otherwise, a periodic pattern alarm is generated in step 12.

It is checked in step 10 if a reliable defocus amount, i.e., a defocus amount satisfying Condition (1) is calculated in step 8. In this checking operation, if the content of the counter S1 for counting the number of defocus amounts which satisfy Condition (1) is 0, it is determined that no defocus amount is calculated; if $S1 \geq 1$, it is determined that the defocus amount is calculated.

If it is determined in step 10 there is no defocus amount satisfying Condition (1), it is checked in step 11 if a horizontal block is a periodic pattern. If YES in step 11, a periodic pattern alarm is generated in step 12. If NO in step 11, since it has already been detected that a vertical block is not a periodic block and there is no reliable block, a focus undetectable alarm is generated in step 13.

If it is determined in step 10 that a reliable defocus amount is present, the flow advances to step 14, and a horizontal defocus amount which is calculated in step 3 and is present within the predetermined range having the reliable defocus amount calculated in step 8 as the center is extracted. A defocus amount to be extracted must have high reliability and satisfy Condition (1).

It is checked in step 15 if the number of extracted defocus amounts is 1. If YES in step 15, the flow advances to step 17 to drive the object-lens based on the extracted horizontal defocus amount. If a plurality of defocus amounts are extracted or no defocus amount is extracted, the flow advances to step 16, and the object-lens is driven based on the vertical defocus amount calculated in step 8.

Figure 11:
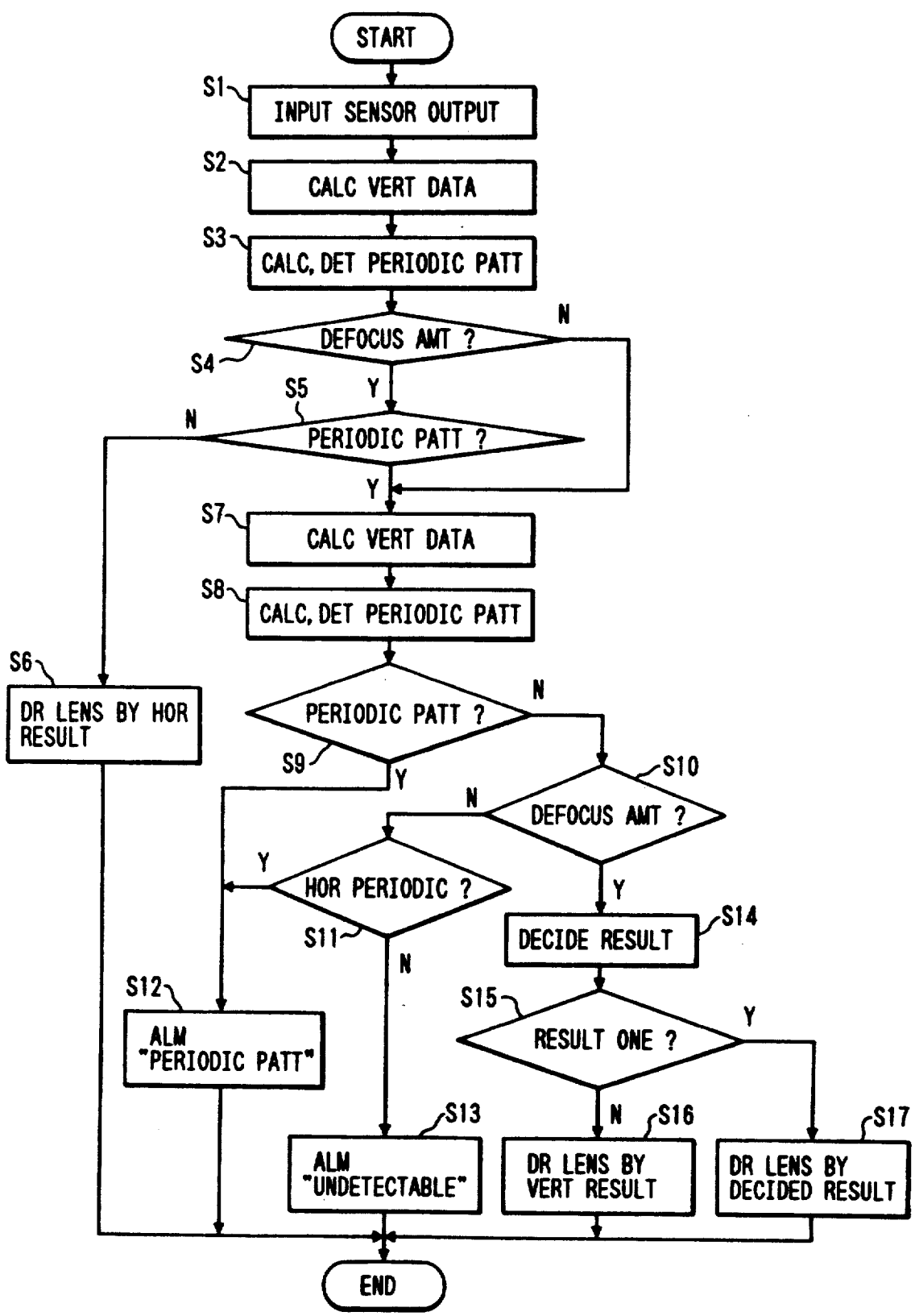
FIG. 11 is a flow chart showing the third embodiment of the present invention.

In step 15 in FIG. 11 described above, it is checked if the number of defocus amounts of one of the horizontal and vertical blocks, which fall within a predetermined range having a defocus amount of the other block as the center, is 1. When the predetermined range is set to be smaller than a minimum unit of a detectable defocus amount restricted by the pitch of the photoelectric transducers of the image sensor arrays A and B when no interpolation calculations are made, a plurality of defocus amounts do not exit in this range. Therefore, in judging step 15, it need only be checked if a defocus amount is present in the predetermined range.

When a horizontal defocus amount is present in a predetermined range having the vertical defocus amount as the center, the selected horizontal defocus amount is preferentially used. However, the present invention is not limited to this. For example, the object-lens may be driven based on one of the vertical defocus amount and the selected horizontal defocus amount, which has a larger E value (i.e., higher reliability) or which indicates a closer distance.

The same shift range is adopted in correlation calculations using the horizontal data in step 3 and correlation calculations using the vertical data in step 8. However, the same shift range need not always be adopted.

In FIG. 11, when a vertical block is not a periodic pattern and a horizontal block is a periodic pattern, if one horizontal defocus amount is present in a predetermined range having a vertical defocus amount as the center, the horizontal defocus amount is adopted. Alternatively, a horizontal defocus amount closest to the vertical defocus amount may be adopted. In this case, a condition that the absolute value of the closest defocus amount falls within a predetermined range may be added. In addition, a vertical/horizontal position sensor comprising, e.g., a mercury switch is arranged in a camera, so that the order or priority of horizontal and vertical focus detection calculations may be changed based on the detection result of this sensor.

The fourth embodiment of a focus detection apparatus of the present invention will be described below. The fourth embodiment is applied to the most basic focus detection apparatus arranged as follows. That is, a pair of image sensor arrays are arranged in one direction corresponding to, e.g., a horizontal direction, and are not divided into blocks, so that focus detection is performed using one block. When a periodic pattern is detected, a periodic pattern alarm is signalled to a photographer.

Figure 12:
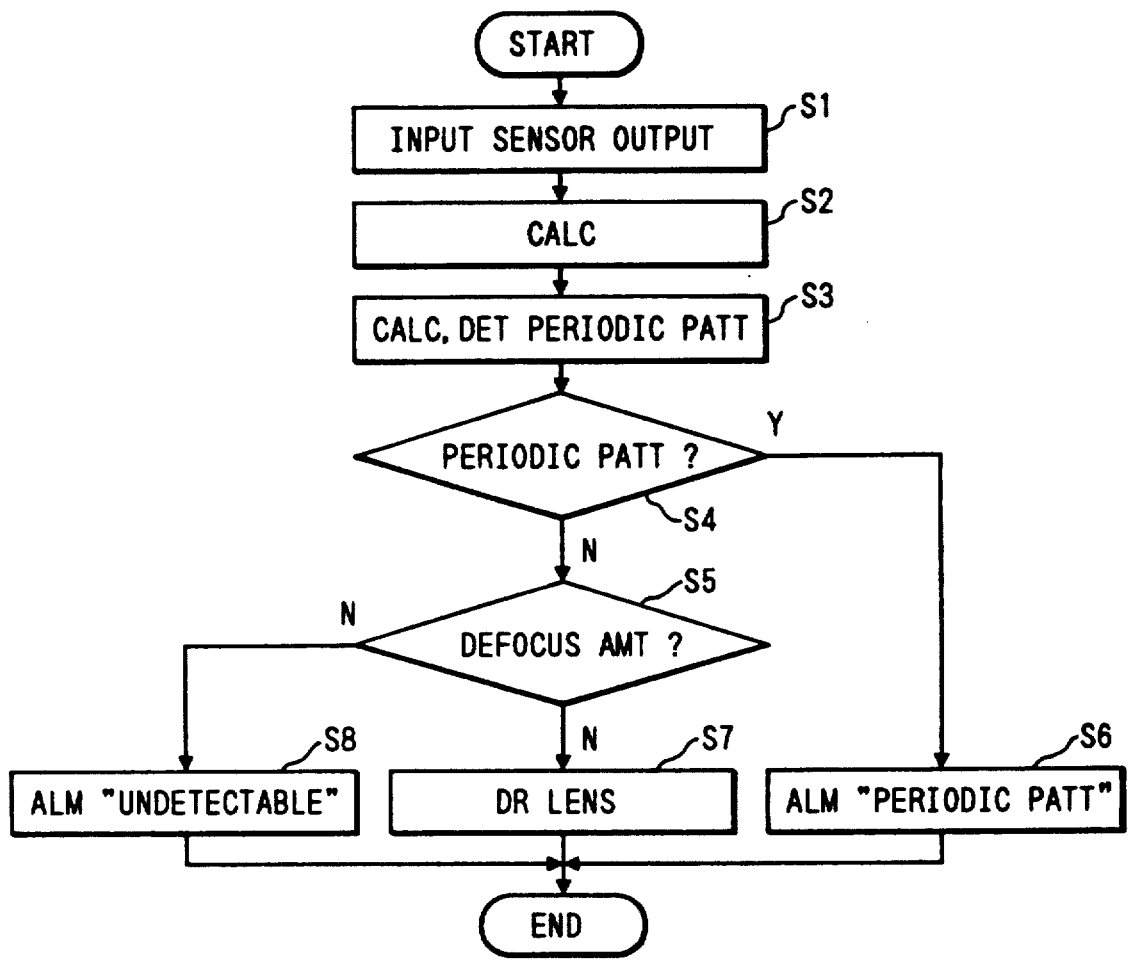
FIG. 12 is a flow chart showing the fourth embodiment of the present invention.

The fourth embodiment will be described in detail below with reference to the flow chart of FIG. 12.

In step 1, photoelectric conversion signals from the image sensor arrays are input to the calculating portion. In step 2, correlation amounts C(L) are calculated by equations (1) within a predetermined range of $-L_{max}$ to $L_{max}$ using data in the Nth block. The range of the shift amount may be changed for each block. In step 3, interpolation calculations and periodic pattern detection are performed by one of the above-mentioned three periodic pattern detection methods. The flow advances to step 4 to check if a periodic pattern is detected in step 3. If YES in step 4, the flow advances to step 7 to generate a periodic pattern alarm; otherwise, the flow advances to step 5. It is checked in step 5 if a reliable defocus amount, i.e., a defocus amount satisfying Condition (1) is calculated. In this checking operation, if the content of a counter S1 for counting the number of defocus amounts which satisfy Condition (1) is 0, it is determined that no defocus amount is calculated; if $S1 \geq 1$, it is determined that the defocus amount is calculated. If there is no reliable defocus amount, the flow advances to step 8 to generate a focus undetectable alarm. If a reliable defocus amount is detected, the flow advances to step 7, and an object-lens is driven based on the defocus amount calculated in step 3.

Figure 14:
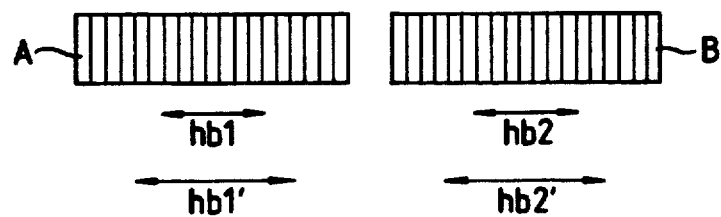
FIG. 14 is a view explaining a case wherein a block range of the image sensor array is widened in the embodiment shown in FIG. 13.

The fifth embodiment of the present invention will be described below. The fifth embodiment is applied to a focus detection apparatus arranged as follows. That is, each of a pair of image sensor arrays is divided into a plurality of blocks to segment an object image, and focus detection calculations are performed for each block. When a certain block is a periodic pattern, the number of photoelectric transducers constituting the block is increased. More specifically, as shown in FIG. 14, focus detection ranges hb1 and hb2 of the image sensor arrays A and B are widened to ranges hb1' and hb2' to retry focus detection calculations.

The fifth embodiment will be described in detail below with reference to the flow chart of FIG. 13. Note that each array has NL blocks 1 to NL.

In step 1, photoelectric conversion signals from the image sensor arrays are input to the calculating portion. In step 2, a variable N indicating a block number for which focus detection calculations are performed is set to be N=1. In step 3, correlation amounts C(L) are calculated by equations (1) within a predetermined range of $-L_{max}$ to $L_{max}$ using data in the Nth block. The range of the shift amount may be changed for each block.

In step 4, interpolation calculations and periodic pattern detection are performed by one of the above-mentioned three periodic pattern detection methods. In step 5, it is checked if a periodic pattern is detected in step 4. If NO in step 5, the flow jumps to step 9. If YES in step 5, the range of a block N is widened in step 6, and correlation calculations are redone in step 7. In step 8, interpolation calculations and periodic pattern detection are executed as in step 4. It is checked in step 9 if the block number N is NL indicating the last block. If NO in step 9, the number N is incremented by 1 in step 10, and the flow returns to step 3. In step 3, operations such as focus detection calculations are performed for a block having the updated number. However, if YES in step 9, since there are no more blocks, the flow advances to step 11.

It is checked in step 11 if focus detection is disabled. The focus detection is disabled when there are no blocks from which defocus amounts satisfying Condition (1) are obtained and when all the blocks satisfying Condition (1), if any, are periodic patterns.

If YES in step 11, the flow advances to step 14 to check if there is a block as a periodic pattern. If YES in step 14, a periodic pattern alarm is generated in step 15; otherwise, a focus undetectable alarm is generated in step 16.

If it is determined in step 11 that focus detection is enabled, the flow advances to step 12. In step 12, of a plurality of defocus amounts obtained by performing focus detection calculations in a plurality of blocks, a defocus amount, which satisfies a predetermined condition like an object at a closest distance, is selected. In step 13, the object-lens is driven based on the selected defocus amount.

In step 12 of FIG. 13, one of a plurality of defocus amounts is selected. Alternatively, defocus amounts giving almost the same value may be grouped, defocus amounts of blocks belonging to the group may be weighted and averaged by the value E, and one of a plurality of defocus amounts calculated by weighting and averaging may be selected to drive the object-lens.

The embodiment shown in FIG. 13 may be applied to a focus detection apparatus in which a pair of image sensor arrays are arranged in a plurality of directions.

In the first to fifth embodiments described above, a focus undetectable alarm and a periodic pattern alarm must be easily identified from each other by a user. When an object is a periodic pattern, this does not mean that focus detection is impossible, but means that a defocus amount cannot be determined. Thus, if an alarm is merely generated, there is no difference from a focus undetectable alarm.

In post-processing of the alarm, a user roughly moves the object-lens to an in-focus state, and thereafter, the object-lens may be driven using a defocus amount closest to the in-focus state.

As described above, according to the present invention, whether or not an object is a periodic pattern can be determined. A periodic pattern alarm can be signalled to a user independently of a focus undetectable alarm caused by a low contrast.

In focus detection apparatuses in which a pair of image sensor arrays are arranged in each of a plurality of directions to perform focus detection or each of a pair of image sensor arrays is divided into a plurality of blocks to perform focus detection for each block, when an object is a periodic pattern, a true defocus amount can be selected with high possibility from a plurality of defocus amounts generated since the object is the periodic pattern. Therefore, even if a periodic pattern is formed, a lens can be driven to an in-focus state on the basis of appropriate focus detection result.

What is claimed is:

1. A focus detection apparatus comprising:
   first photoelectric conversion means having a plurality of first light receiving regions for outputting electrical signals corresponding to light receiving amounts;
   second photoelectric conversion means having a plurality of second light receiving regions for outputting electrical signals corresponding to light receiving amounts;
   third photoelectric conversion means having a plurality of third light receiving regions for outputting electrical signals corresponding to light receiving amounts;
   fourth photoelectric conversion means having a plurality of fourth light receiving regions for outputting electrical signals corresponding to light receiving amounts;
   said first and second photoelectric conversion means being arranged to be perpendicular to said third and fourth photoelectric conversion means;
   optical means for splitting an object image into two images to cause the two images to be focused on said first and second photoelectric conversion means, and for splitting the object image into two images to cause the two images to be respectively focused on said third and fourth photoelectric conversion means;
   judging means for obtaining a plurality of differences between different pairs of electrical signals, each pair corresponding to a part of said first light receiving regions and a part of said second light receiving regions, comparing the obtained differences to determine a first local minimum value, and determining that the object image has a periodic contrast pattern when there are at least two first local minimum values; and outputting means for, when said judging means determines that the object image has the periodic contrast pattern, obtaining a plurality of differences between different pairs of electrical signals, each pair corresponding to a part of said third light receiving regions and a part of said fourth light receiving regions, comparing the obtained differences to determine a second local minimum value, and for, when one first local minimum value is present in a predetermined range having the second local minimum value as the center, outputting the first local minimum value as focus detection data.

2. A focus detection apparatus comprising:

first photoelectric conversion means having a first light receiving region for outputting an electrical signal corresponding to a light intensity distribution on said first light receiving region;

second photoelectric conversion means having a second light receiving region for outputting an electrical signal corresponding to a light intensity distribution on said second light receiving region;

optical means for splitting a light beam from a focus detecting area within an object to be photographed into two light beams to direct one of the two light beams on said first photoelectric conversion means and the other of the two light beams on said second photoelectric conversion means;

focus information producing means for producing at least one focus information with respect to a focus condition of a photo-taking lens and producing at least one reliable information corresponding to reliability of said at least one focus information on the basis of the electrical signal corresponding to at least one part of said first light receiving region and the electrical signal corresponding to at least one part of said second light receiving region; and pattern judging means having a first condition and a second condition which is broader than said first condition for discriminating that said at least one reliable information satisfies said first and said second conditions, said pattern judging means judging that the object image has a periodic contrast pattern when at least two reliable informations are produced and said at least two reliable informations satisfy at least one of said first and said second conditions.

3. A focus detection apparatus according to claim 2, wherein said at least one reliable information has a contrast information value with respect to contrast and a noise information value with respect to noise, wherein said first condition has a first predetermined value with respect to contrast and a second predetermined value with respect to noise, and wherein said second condition has a third predetermined value which is smaller than said first predetermined value with respect to contrast and a fourth predetermined value which is larger than said second predetermined value with respect to noise.

4. A focus detection apparatus according to claim 3, wherein said pattern judging means judges that the reliable information satisfies said first condition when the contrast information value of the reliable information is larger than said first predetermined value and the noise information value of the reliable information is smaller than said second predetermined value, and wherein said pattern judging means judges that the reliable information satisfies said second condition when the contrast information value of the reliable information is larger than said third predetermined value and the noise information value of the reliable information is smaller than said fourth predetermined value.

5. A focus detection apparatus according to claim 4, wherein said pattern judging means has a third condition with which the contrast information value of the reliable information is compared, wherein the value of said third condition is larger than said first and said third predetermined values.

6. A focus detection apparatus according to claim 4, wherein said pattern judging means judges that the object image does not have the periodic contrast pattern when there is only one reliable information satisfying said third condition and there is only one reliable information satisfying at least one of said first and said second conditions and not satisfying said third condition.

7. A camera comprising:

first photoelectric conversion means having a first light receiving region for outputting an electrical signal corresponding to a light intensity distribution on said first light receiving region;

second photoelectric conversion means having a second light receiving region for outputting an electrical signal corresponding to a light intensity distribution on said second light receiving region;

third photoelectric conversion means having a third light receiving region for outputting an electrical signal corresponding to a light intensity distribution on said third light receiving region;

fourth photoelectric conversion means having a fourth light receiving region for outputting an electrical signal corresponding to a light intensity distribution on said fourth light receiving region;

optical means for splitting a light beam from a first focus detecting area within an object to be photographed into two light beams to direct one of the two light beams on said first photoelectric conversion means and the other of the two light beams on said second photoelectric conversion means, and for splitting a light beam from a second focus detecting area within the object into two light beams to direct one of the two light beams corresponding to the second focus detecting area on said third photoelectric conversion means and the other of the two light beams corresponding to the second focus detecting area on said fourth photoelectric conversion means, said first focus detecting area and said second focus detecting area crossing each other;

focus information producing means for producing at least one focus information with respect to a focus condition of a photo-taking lens and producing at least one reliable information corresponding to reliability of said at least one focus information on the basis of the electrical signals from said first, said second, said third and said fourth photoelectric conversion means;

drive controlling means for controlling the drive of the photo-taking lens on the basis of said at least one focus information;

pattern judging means responsive to said at least one reliable information for judging whether or not said first detecting area has a periodic pattern and producing a pattern judging signal when said pattern judging means judges that said first detecting area has the periodic pattern; and changing means responsive to said pattern judging signal for inhibiting said drive controlling means from controlling the drive of the photo-taking lens on the basis of at least one focus information corresponding to said first focus detecting area, and causing said drive controlling means to control the drive of the photo-taking lens on the basis of at least one focus information corresponding to said second focus detecting area.

8. A camera according to claim 7, wherein said pattern judging means judges whether or not said second detecting area has the periodic pattern after the judgement of said first detecting area on the basis of said at least one reliable information and produces another pattern judging signal when said pattern judging means judges that said second detecting area has the periodic pattern, and wherein said changing means inhibits said drive controlling means from controlling the drive of the photo-taking lens on the basis of said at least one focus information corresponding to said second focus detecting area in response to the second-mentioned pattern judging signal.

9. A focus detection apparatus comprising:

first photoelectric conversion means having a first light receiving region for outputting an electrical signal corresponding to a light intensity distribution on said first light receiving region;

second photoelectric conversion means having a second light receiving region for outputting an electrical signal corresponding to a light intensity distribution on said second light receiving region;

optical means for splitting a light beam from a focus detecting area within an object to be photographed into two light beams so that one of the two light beams is incident on said first photoelectric conversion means and the other of the two light beams is incident on said second photoelectric conversion means;

focus detecting means for obtaining a plurality of differences between different pairs of electrical signals, each pair corresponding to a part of said first light receiving region and a part of said second light receiving region, comparing the obtained differences to determine at least one local minimum value, producing at least one focus information corresponding to said at least one local minimum value, and producing at least one reliable information corresponding to the reliability of said at least one focus information;

pattern judging means having a pattern judging condition for judging from said at least one reliable information on the basis of said pattern judging condition whether or not an object image has a periodic contrast pattern;

driving means for driving a photo-taking lens on the basis of the focus information;

inhibiting means for inhibiting said driving means from driving said photo-taking lens when said focus detecting means does not determine the local minimum value or when said pattern judging means judges that the object image has the periodic contrast pattern;

focus detection displaying means responsive to said focus detecting means for displaying that said focus detecting means does not produce the focus information; and pattern judging displaying means responsive to said pattern judging means for displaying that the object image has the periodic contrast pattern.

10. A camera comprising:

first photoelectric conversion means having a first light receiving region for outputting an electrical signal corresponding to a light intensity distribution on said first light receiving region;

second photoelectric conversion means having a second light receiving region for outputting an electrical signal corresponding to a light intensity distribution on said second light receiving region;

third photoelectric conversion means having a third light receiving region for outputting an electrical signal corresponding to a light intensity distribution on said third light receiving region;

fourth photoelectric conversion means having a fourth light receiving region for outputting an electrical signal corresponding to a light intensity distribution on said fourth light receiving region;

optical means for splitting a light beam from a first focus detecting area within an object to be photographed into two light beams to direct one of the two light beams on said first photoelectric conversion means and the other of the two light beams on said second photoelectric conversion means, and for splitting a light beam from a second focus detecting area within the object into two light beams to direct one of the two light beams corresponding to the second focus detecting area on said third photoelectric conversion means and the other of the two light beams corresponding to the second focus detecting area on said fourth photoelectric conversion means, said first focus detecting area expanding along a first direction, said second focus detecting area expanding along a second direction which crosses said first direction;

focus information producing means for producing focus information including at least one defocus amount corresponding to at least one part of said first focus detecting area and at least one part of said second focus detecting area and for producing at least one reliable information corresponding to reliability of the focus information on the basis of the electrical signals from said first, said second, said third and said fourth photoelectric conversion means;

pattern judging means for judging that a focus detecting area has a periodic pattern when said focus information producing means produces a plurality of reliable information corresponding to that focus detecting area;

detecting means for detecting whether or not a plurality of defocus amounts, which said focus information producing means produces on the basis of the electrical signals corresponding to said at least one part of said first focus detecting area, are within a range based on a defocus amount corresponding to said at least one part of said second focus detecting area when said judging means judges that said first focus detecting area has the periodic pattern and that said second focus detecting area does not have the periodic pattern; and storing means responsive to said detecting means for storing therein a defocus amount corresponding to said at least one part of said first focus detecting area when there is only one defocus amount corresponding to said at least one part of said first focus detecting area within said range.

11. A camera according to claim 10, which further comprises driving means for driving a photo-taking lens on the basis of the defocus amount stored in said storing means.

12. A camera comprising:
first photoelectric conversion means having a first light receiving region for outputting an electrical signal corresponding to a light intensity distribution on said first light receiving region;
second photoelectric conversion means having a second light receiving region for outputting an electrical signal corresponding to a light intensity distribution on said second light receiving region;
third photoelectric conversion means having a third light receiving region for outputting an electrical signal corresponding to a light intensity distribution on said third light receiving region;
fourth photoelectric conversion means having a fourth light receiving region for outputting an electrical signal corresponding to a light intensity distribution on said fourth light receiving region;
optical means for splitting a light beam from a first focus detecting area within an object to be photographed into two light beams to direct one of the two light beams on said first photoelectric conversion means and the other of the two light beams on said second photoelectric conversion means, and for splitting a light beam from a second focus detecting area within the object into two light beams to direct one of the two light beams corresponding to the second focus detecting area on said third photoelectric conversion means and the other of the two light beams corresponding to the second focus detecting area on said fourth photoelectric conversion means, said first focus detecting area expanding along a first direction, said second focus detecting area expanding along a second direction which crosses said first direction;
focus information producing means for producing focus information including at least one of said first focus corresponding to at least one part of said first focus detecting area and at least one part of said second focus detecting area and for producing at least one reliable information corresponding to reliability of said focus information on the basis of the electrical signals from said first, said second, said third and said fourth photoelectric conversion means;
pattern judging means for judging that a focus detecting area has a periodic pattern when said focus information producing means produces a plurality of reliable information corresponding to that focus detecting area; and
defocus judging means for judging whether or not a plurality of defocus amounts, which said focus information producing means produces on the basis of the electrical signals corresponding to said at least one part of said first focus detecting area, are within a range based on a defocus amount corresponding to said at least one part of said second focus detecting area when said judging means judges that said first focus detecting area has the periodic pattern and that said second focus detecting area does not have the periodic pattern.

13. A camera comprising:
first photoelectric conversion means having a first light receiving region for outputting an electrical signal corresponding to a light intensity distribution on said first light receiving region;
second photoelectric conversion means having a second light receiving region for outputting an electrical signal corresponding to a light intensity distribution on said second light receiving region;
optical means for splitting a light beam from a focus detecting area within an object to be photographed into two light beams to direct one of the two light beams on said first photoelectric conversion means and the other of the two light beams on said second photoelectric conversion means;
focus information producing means for producing focus information including at least one defocus amount corresponding to each of a plurality of blocks in the focus detecting area and for producing at least one reliable information corresponding to reliability of said focus information on the basis of the electrical signals from said first and said second photoelectric conversion means;
pattern judging means for judging that at least one of the plurality of blocks in the focus detecting area has a periodic pattern when said focus information producing means produces a plurality of reliable information corresponding to said at least one of the plurality of blocks;
detecting means for detecting whether or not a plurality of defocus amounts, which said focus information producing means produces with respect to said at least one of the plurality of blocks, are within a range based on a defocus amount corresponding to a different one of the plurality of blocks when said judging means judges that said at least one of the plurality of blocks has the periodic pattern and that said different one of the plurality of blocks does not have the periodic pattern; and
storing means responsive to said detecting means for stored therein the defocus amount corresponding to said at least one of the plurality of blocks when there is only one defocus amount corresponding to said at least one of the plurality of blocks within said range.

14. A camera according to claim 13, which further comprises driving means for driving a photo-taking lens on the basis of the defocus amount stored in said storing means.

15. A camera comprising:
first photoelectric conversion means having a first light receiving region for outputting an electrical signal corresponding to a light intensity distribution on said first light receiving region;
second photoelectric conversion means having a second light receiving region for outputting an electrical signal corresponding to a light intensity distribution on said second light receiving region;
optical means for splitting a light beam from a focus detecting area within an object to be photographed into two light beams to direct one of the two light beams on said first photoelectric conversion means and the other of the two light beams on said second photoelectric conversion means;
focus information producing means for producing focus information including at least one defocus amount corresponding to each of a plurality of blocks in the focus detecting area and for producing at least one reliable information corresponding to reliability of said focus information on the basis of the electrical signals from said first and said second photoelectric conversion means;

pattern judging means for judging that at least one of the plurality of blocks in the focus detecting area has a periodic pattern when said focus information producing means produces a plurality of reliable information corresponding to said at least one of the plurality of blocks; and defocus judging means for judging whether or not a plurality of defocus amounts, which said focus information producing means produces on the basis of the electrical signals corresponding to said at least one of the plurality of blocks, are within a range based on a defocus amount corresponding to a different one of the plurality of blocks when said judging means judges that said at least one of the plurality of blocks has the periodic pattern and that said different one of the plurality of blocks does not have the periodic pattern.

16. A camera comprising:

first photoelectric conversion means having a first light receiving region for outputting an electrical signal corresponding to a light intensity distribution on said first light receiving region;

second photoelectric conversion means having a second light receiving region for outputting an electrical signal corresponding to a light intensity distribution on said second light receiving region;

optical means for splitting a light beam from a focus detecting area within an object to be photographed into two light beams to direct one of the two light beams on said first photoelectric conversion means and the other of the two light beams on said second photoelectric conversion means;

focus information producing means for producing at least one focus information corresponding to a first predetermined part in the focus detecting area and for producing at least one reliable information corresponding to reliability of said at least one focus information on the basis of the electrical signals from said first and said second photoelectric conversion means; and pattern judging means for judging whether or not said first predetermined part has a periodic pattern and producing a periodic pattern signal when said first predetermined part has the periodic pattern, said focus information producing means producing at least one focus information corresponding to a second predetermined part which is larger than said first predetermined part.

* * * * *